(12) United States Patent
Nguyen et al.

(10) Patent No.: US 10,975,292 B2
(45) Date of Patent: Apr. 13, 2021

(54) OMNIPHOBIC EMULSIONS FOR MITIGATING GAS CONDENSATE BANKING AND METHODS OF MAKING AND USING SAME

(71) Applicant: Halliburton Energy Services, Inc., Houston, TX (US)

(72) Inventors: Philip D. Nguyen, Houston, TX (US); Tatyana V. Khamatnurova, Spring, TX (US)

(73) Assignee: Halliburton Energy Sendees, Inc., Houston, TX (US)

(*) Notice: Subject to any disclaimer, the term of this patent is extended or adjusted under 35 U.S.C. 154(b) by 22 days.

(21) Appl. No.: 16/439,096

(22) Filed: Jun. 12, 2019

(65) Prior Publication Data
US 2020/0392399 A1 Dec. 17, 2020

(51) Int. Cl.
*C09K 8/70* (2006.01)
*C09K 8/60* (2006.01)
*C09K 8/80* (2006.01)

(52) U.S. Cl.
CPC .............. *C09K 8/703* (2013.01); *C09K 8/602* (2013.01); *C09K 8/80* (2013.01)

(58) Field of Classification Search
None
See application file for complete search history.

(56) References Cited

U.S. PATENT DOCUMENTS

| | | |
|---|---|---|
| 5,324,566 A | 6/1994 | Ogawa et al. |
| 5,571,622 A | 11/1996 | Ogawa et al. |
| 6,945,327 B2 | 9/2005 | Ely et al. |
| 2007/0029085 A1 | 2/2007 | Panga et al. |
| 2010/0167965 A1 | 7/2010 | Sebastian et al. |
| 2013/0068459 A1* | 3/2013 | Kippie ................. C09K 8/565 166/278 |
| 2018/0244985 A1 | 8/2018 | Almohsin et al. |

OTHER PUBLICATIONS

Ahmed, T., et al.; Wellbore Liquid Blockage in Gas-Condensate Reservoirs; 1998, SPE 51050, pp. 119-129, Society of Petroleum Engineers Inc.

(Continued)

*Primary Examiner* — Jeffrey D Washville
(74) *Attorney, Agent, or Firm* — Conley Rose, P.C.; Rodney B. Carroll

(57) ABSTRACT

An omniphobic emulsion comprising an aqueous continuous phase having dispersed therein a plurality of non-aqueous discontinuous phase droplets; wherein the non-aqueous discontinuous phase droplets are characterized by a droplet size of less than about 100 micrometers (μm); wherein each of the plurality of non-aqueous discontinuous phase droplets comprises a plurality of surfactant molecules and an omniphobic agent, wherein each surfactant molecule has a hydrophilic head portion and a hydrophobic tail portion; wherein each of the plurality of non-aqueous discontinuous phase droplets comprises the plurality surfactant molecules having the hydrophilic head portions disposed into a droplet outer layer with the hydrophobic tail portions extending inward from the droplet outer layer toward the omniphobic agent; and wherein the droplet outer layer encloses the omniphobic agent.

20 Claims, 2 Drawing Sheets

(56) References Cited

OTHER PUBLICATIONS

Bang, V., et al.; Relative Permeability of Gas-Condensate Fluids: A General Correlation; 2006, SPE 102741, 8 pages, Society of Petroleum Engineers Inc.

Binmerdhah, A.B., et al.; Understanding the Behaviors of Gas Condensate Reservoirs; 2015, vol. 02, Issue 08, pp. 966-971, International Research Journal of Engineering and Technology (IRJET).

Boreyko, J., et al.; Self-Propelled Dropwise Condensate on Superhydrophobic Surfaces; 2009, PRL 103, pp. 184501-1 to 184501-4; The American Physical Society.

Sayed, M.A., et al.; Mitigation of the Effects of Condensate Banking: A Critical Review; 2016, SPE 168153, SPE Production & Operations; pp. 85-102; Society of Petroleum Engineers.

* cited by examiner

OMNIPHOBIC EMULSIONS FOR MITIGATING GAS CONDENSATE BANKING AND METHODS OF MAKING AND USING SAME

BACKGROUND

This disclosure relates to methods of servicing a wellbore. More specifically, it relates to methods of treating a wellbore with emulsions comprising omniphobic agents.

Natural resources (e.g., oil or gas) residing in the subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a treatment fluid (e.g., a fracturing fluid, a gravel packing fluid, etc.) may be pumped down the wellbore at a rate and a pressure sufficient to form or enhance fractures that extend into the formation, providing additional pathways through which the oil or gas can flow to the well. To maintain the fractures open when the fracturing pressures are removed, a particulate material such as a propping agent (i.e., a proppant) may be used.

During gas recovery processes, when the pressure in a gas condensate reservoir is reduced below the dew point, the fluid in the reservoir separates into a liquid phase and a vapor phase. In the region near the wellbore, the pressure gradient is generally steeper, resulting in a greater liquid/gas ratio. Depending on the critical liquid saturation and gas flow rate, the liquid saturation can build up quickly, thereby hindering the flow of gas and hindering gas recovery. This phenomenon (i.e., liquid accumulation) is referred to as "condensate banking." Under condensate banking conditions, high surface energy minerals in the subterranean formation promote spreading of condensate film on the rock surface, wetting out pore surfaces, thereby leading to condensate accumulation (i.e., the formation of a condensate bank). The accumulated condensate restricts open paths for flowing gas, thereby reducing well productivity.

The effect of condensate banking could be decreased by increasing the wettability by gas of the porous formation in the gas condensate reservoir relative to the wettability by liquid in the formation, thereby increasing production of gas from wells. Conventionally, the use of solvents and surfactants such as methanol has been suggested as a way to stimulate gas/condensate wells in which hydraulic fracturing is not the preferred option. The use of methanol could result in removal of the condensate and water banks around a wellbore, which could allow gas flow to be unimpeded through the near-wellbore region, and thus could result in smaller drawdown and slower accumulation of condensate. Within certain ranges of temperature and pressure, the presence of a residual methanol phase in the near-wellbore region can also result in the inhibition of condensate formation for a limited period of time. However, the use of methanol is only a temporary solution because methanol treatments have to be repeated.

When treatment fluids are used for hydraulic fracturing, one potential issue can be removal or recovery of fracturing fluid from the hydraulic fracture. Fracturing fluids which remain in the hydraulic fracture after completion of a fracturing job are detrimental to the performance of hydraulically fractured wells by reducing the conductivity of the hydraulic fracture. During the production stage of the well, liquid, water, or hydrocarbons may undesirably build up in the hydraulic fracture as a result of the presence of fracturing fluid downhole. Such fluid build-up can reduce permeability of gas and/or oil through the fracture (e.g., reduces conductivity) and negatively impact productivity. Thus, an ongoing need exists for compositions that can modify the wettability of downhole surfaces (e.g., surfaces in the wellbore and/or subterranean formation), and methods of making and using same.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
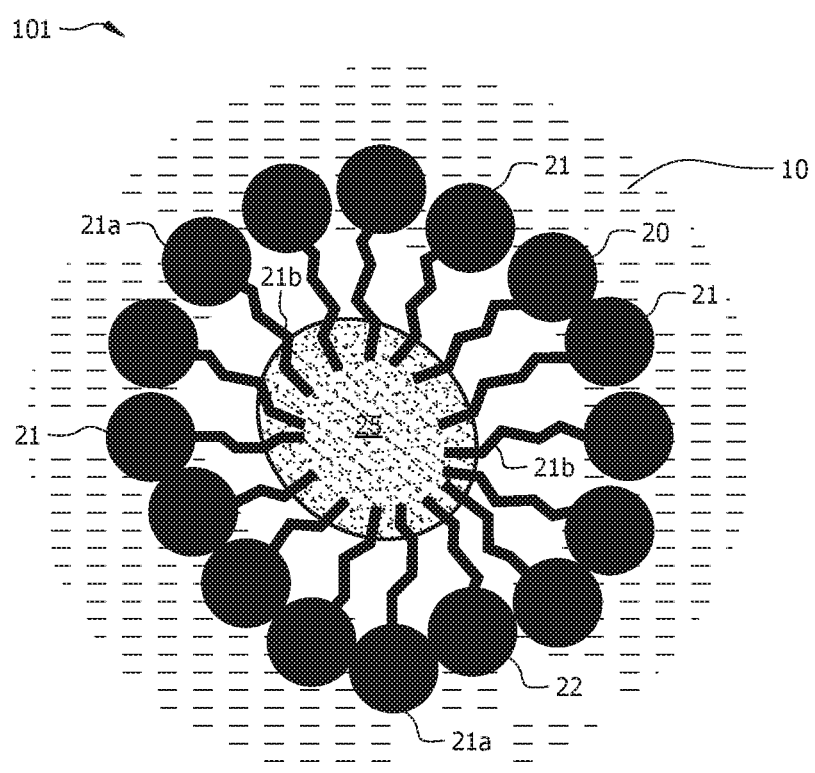
FIG. 1A displays a schematic of a cross-section through a non-aqueous discontinuous phase droplet in an omniphobic emulsion.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are omniphobic emulsions and methods of making and using same. In some embodiments, the omniphobic emulsion can comprise an aqueous continuous phase having dispersed therein a plurality of non-aqueous discontinuous phase droplets; wherein each of the plurality of non-aqueous discontinuous phase droplets comprises a plurality of surfactant molecules and an omniphobic agent; and wherein the surfactant molecules enclose the omniphobic agent. In some embodiments, the omniphobic emulsion can be an omniphobic emulsion foam, wherein the omniphobic emulsion foam comprises an aqueous continuous phase having dispersed therein a plurality of non-aqueous discontinuous phase droplets and a plurality of discontinuous gas phase pores; wherein at least a portion of the non-aqueous discontinuous phase droplets are disposed at a gas-liquid interface between the aqueous continuous phase and the plurality of discontinuous gas phase pores, thereby forming a plurality of non-aqueous discontinuous phase shells; and wherein each of the plurality of non-aqueous discontinuous phase shells encloses a discontinuous gas phase pore. The omniphobic agent can impart the property of being both water repellent and oil repellent to treated surfaces (e.g., surfaces treated with an omniphobic agent), such as formation pores, fracture faces, proppant surfaces, sand surfaces, and the like, or combinations thereof.

In some embodiments, an omniphobic agent can be part of an emulsion, for example the omniphobic agent can be micro- and/or nano-emulsified with surfactants and water to form microemulsions and/or nanoemulsions, respectively, to be carried in an aqueous fluid, wherein the emulsion can be a liquid or a foam (e.g., when the emulsion is formed in the presence of a gas, such as methane, liquefied natural gas, nitrogen, carbon dioxide, etc.).

Further disclosed herein are wellbore servicing fluids or compositions (collectively referred to herein as WSFs) and methods of using same; wherein the WSFs can comprise an omniphobic emulsion as disclosed herein. In some embodiments, a WSF comprising an omniphobic emulsion as disclosed herein can be applied as a primary (e.g., prophylactic) and/or a remedial treatment fluid that can be injected into the near-wellbore formations and/or near-wellbore propped fractures to prevent and/or mitigate the formation of condensate banking, or alternatively to remove existing condensate banking in the treated areas. Microemulsions and/or nanoemulsions comprising omniphobic agents can provide a long lasting treatment system for both primary and/or remedial treatments in near-wellbore formations and/or near-wellbore propped fractures to prevent and/or mitigate formation of gas condensate banks (e.g., in gas and/or producing wells) or to remove the existing condensate banks for restoring gas and/or oil production flow path.

In some embodiments, for example as depicted in FIG. 1A which displays a schematic of a cross-section 101 through a non-aqueous discontinuous phase droplet in an omniphobic emulsion, an omniphobic emulsion as disclosed herein can comprise an aqueous continuous phase 10 having dispersed therein a plurality of non-aqueous discontinuous phase droplets 20. Water present in the aqueous continuous phase 10 may be from any suitable source, examples of which include, but are not limited to, sea water, tap water, freshwater, water that is potable or non-potable, untreated water, partially treated water, treated water, produced water, city water, well-water, surface water, liquids comprising water-miscible organic compounds, and combinations thereof.

In some embodiments, each of the plurality of non-aqueous discontinuous phase droplets 20 can comprise a plurality of surfactant 21 molecules and an omniphobic agent 25.

Generally, a surfactant (e.g., surface active agent; surfactant 21) functions to improve compatibility between fluids (e.g., aqueous fluid, wellbore servicing fluid, aqueous continuous phase, omniphobic agent, fluids naturally present in a subterranean formation, etc.), or compatibility between a fluid (e.g., wellbore servicing fluid, emulsion, omniphobic emulsion, fluids naturally present in a subterranean formation, etc.) and a solid surface (e.g., a downhole surface), by lowering the surface tension between the fluids, or the fluid and the surface, respectively. Without being limited by theory, a surfactant lowers the surface tension of the medium in which it is dissolved, and/or the interfacial tension with other phases by positioning at an interface between phases (e.g., a liquid-solid interface; a liquid-gas interface; a liquid-liquid interface between immiscible liquids; etc.). For purposes of the disclosure herein, liquids that display phase separation (and thus have an interface between distinct liquid phases) are considered immiscible liquids. Further, for purposes of the disclosure herein, the term "surfactant" refers to any suitable compound that can stabilize the omniphobic emulsions as disclosed herein and encompasses detergents, emulsifiers, dispersants, oil-wetters, water-wetters, co-solvents (which can be alcohols, for example), and the like, or combinations thereof. In embodiments where an alcohol co-solvent is used as the surfactant, the omniphobic emulsion may comprise from about 10 vol. % to about 50 vol. %, alternatively from about 25 vol. % to about 40 vol. %, or alternatively from about 20 vol. % to about 35 vol. % alcohol, based on the total volume of the omniphobic emulsion.

In some embodiments, the surfactant 21 may be characterized by a hydrophilic-lipophilic balance (HLB) in the range of from about 8 to about 20, alternatively from about 8 to about 18, or alternatively from about 10 to about 16. HLB is a measure of the degree to which a compound (e.g., surfactant 21) is hydrophilic or hydrophobic (i.e., lipophilic), and indicates the ability of a compound (e.g., surfactant 21) to stabilize an emulsion. HLB is generally expressed on a scale from 0 to 20, where HLB values lower than about 8-10 indicate water insoluble compounds (e.g., compounds with an elevated number of hydrophobic components), and HLB values higher than about 8-10 indicate water soluble compounds (e.g., compounds with an elevated number of hydrophilic components). The more hydrophilic components (e.g., alkoxylating elements in an alkoxylated alcohol) are present in a compound (e.g., surfactant 21), the higher the HLB value for that compound. Without being limited by theory, HLB values over 8-10 for a compound (e.g., surfactant 21) indicate that such compound (e.g., surfactant 21) might have the ability to stabilize oil-in-water emulsions (e.g., omniphobic emulsions). According to Bancroft's rule (i.e., a surfactant stabilizes the emulsion type where the continuous phase is the medium in which the surfactant is most soluble), a surfactant capable of stabilizing an oil-in-water emulsion (e.g., omniphobic emulsions) has to be more soluble in water than in oil, which corresponds to HLB values above about 8-10.

Generally, surfactants (e.g., surfactant 21) are amphiphilic molecules that contain a hydrophilic head portion 21a (e.g., polar head group; hydrophilic component) and a hydrophobic tail portion 21b (e.g., non-polar tail group; hydrophobic component; lipophilic component), for example as depicted in FIG. 1A. Typically, the hydrophobic tail portion 21b can be a linear or branched alkyl chain, while the hydrophilic head portion 21a can be a polar functional group (e.g., non-ionic functional group, cationic functional group, anionic functional group). As will be appreciated by one of skill in the art, and with the help of this disclosure, and without being limited by theory, owing to distinct differences in hydrophilicity/hydrophobicity between the hydrophilic head (e.g., hydrophilic head portion 21a) and the hydrophobic tail (e.g., hydrophobic tail portion 21b), surfactants generally reside at interfaces between various phases (e.g., a liquid-solid interface; a liquid-gas interface; a liquid-liquid interface between immiscible liquids; etc.).

In some embodiments, surfactant 21 is disposed at an interface between the aqueous continuous phase 10 and the omniphobic agent 25, thereby enclosing the omniphobic agent 25 and stabilizing the omniphobic emulsion. In some embodiments, for example as depicted in FIG. 1A, each of the plurality of non-aqueous discontinuous phase droplets 20 comprises a plurality of surfactant 21 molecules having the hydrophilic head portions 21a disposed into a droplet outer layer 22 with the hydrophobic tail portions 21b extending inward from the droplet outer layer 22 toward the omniphobic agent 25; wherein the droplet outer layer 22 encloses the omniphobic agent 25.

Nonlimiting examples of the surfactant 21 suitable for use in the present disclosure include an alkanolamide surfactant, an alcohol, an alkoxylated alcohol, an ethoxylated alcohol, a fatty acid ethoxylated surfactant, an alkyl glycoside surfactant, an amine-oxide surfactant, an olefin sulfonate, a betaine, a branched alcohol, a polyol, a polyamine, an anionic surfactant, a cationic surfactant, an amphoteric surfactant, and the like, or combinations thereof.

Nonlimiting example of commercially available surfactants (e.g., detergents, emulsions, microemulsions, etc.) suitable for use in the present disclosure include CFS™-485 casing cleaner, LOSURF™-300M surfactant, LOSURF™-357 surfactant, LOSURF™-400 surfactant, LOSURF™-2000S surfactant, LOSURF™-2000M surfactant, LOSURF™-259 nonemulsifier, NEA-96M™ surfactant, BDF™-442 surfactant, and BDF™-443 surfactant. CFS™-485 casing cleaner is a blend of surfactants and alcohols; LOSURF™-300M surfactant is a nonionic surfactant; LOSURF™-357 surfactant is a nonionic liquid surfactant; LOSURF™-400 surfactant is a nonemulsifier; LOSURF™-2000S surfactant is a blend of an anionic nonemulsifier and an anionic hydrotrope; LOSURF™-2000M surfactant is a solid surfactant; LOSURF™-259 nonemulsifier is a nonionic, nonemulsfier blend; NEA-96M™ surfactant is a general surfactant and nonemulsifier; BDF™-442 surfactant and BDF™-443 surfactant are acid-responsive surfactants; all of which are commercially available from Halliburton Energy Services.

Other nonlimiting example of commercially available surfactants (e.g., detergents, emulsions, microemulsions, etc.) suitable for use in the present disclosure include TERGITOL™ 15-S-9 surfactant, which is commercially available from The Dow Chemical Company; TERGITOL™ 15-S-7 surfactant, which is commercially available from The Dow Chemical Company; AMADOL® 511 nonionic alkanolamide water-based mud additive, which is commercially available from Akzo Nobel Surface Chemistry; STEPANOL® WAT-K anionic surfactant, which is commercially available from Stepan; BASAROL® demulsifiers, which are commercially available from BASF; EXXAL™ alcohols, which are commercially available from ExxonMobil; CLEARBREAK® demulsifiers, which are commercially available from Solvay; UNIDYNE™ TG-5543 weak cationic water emulsion, which is commercially available from Daikin; and the like; or combinations thereof.

In some embodiments, the surfactant 21 can be present in the omniphobic emulsion in an amount of from about 0.01 wt. % to about 10 wt. %, alternatively from about 0.01 wt. % to about 5 wt. %, alternatively from about 0.01 wt. % to about 3 wt. %, alternatively from about 0.05 wt. % to about 2.5 wt. %, alternatively from about 0.1 wt. % to about 2 wt. %, alternatively from about 0.5 wt. % to about 1.5 wt. %, alternatively from about 0.05 wt. % to about 10 wt. %, alternatively from about 0.1 wt. % to about 7.5 wt. %, or alternatively from about 1 wt. % to about 5 wt. %, based on the total weight of the omniphobic emulsion.

For purposes of the disclosure herein, the term "omniphobic agent" refers to any suitable compound that can impart omniphobic properties (e.g., decreased wettability) to a surface that it comes in contact with (e.g., a surface that it treats), such as a surface treated with the omniphobic agent.

Further, for purposes of the disclosure herein, the term "wettability" refers to the ability of a liquid (e.g., water, a hydrophilic liquid, oil, an oleaginous liquid, a hydrophobic liquid, and the like, or combinations thereof) to maintain contact with a solid surface (i.e., the ability of a liquid to wet a solid surface). Furthermore, for purposes of the disclosure herein, the terms "omniphobic," "superhydrophobic," and "ultrahydrophobic" can be used interchangeably and refer to compounds (e.g., omniphobic agent; superhydrophobic agent; ultrahydrophobic agent) and/or treated surfaces (e.g., omniphobic surface; superhydrophobic surface; ultrahydrophobic surface). Generally, an omniphobic surface (e.g., a treated surface) is liquid-repellent (both water-repellent and oil-repellent); i.e., a liquid (water and/or oil) does not wet an omniphobic surface (e.g., an omniphobic surface has decreased wettability). Omniphobic materials (e.g., omniphobic surfaces; treated surfaces) repel both hydrophilic liquids (e.g., water-repellent surface) and hydrophobic liquids (e.g., oil-repellent surface). In other words, hydrophilic liquids (e.g., aqueous liquids) and/or hydrophobic liquids (e.g., oleaginous liquids) do not wet omniphobic materials, owing to omniphobic materials having a decreased wettability. A surface treated with an omniphobic agent (e.g., treated surface) displays a decreased wettability (e.g., decreased wettability to a liquid selected from the group consisting of water, an aqueous liquid, a hydrophilic liquid, oil, an oleaginous liquid, a hydrophobic liquid, and combinations thereof) when compared to the wettability of an otherwise similar surface that has not been treated with an omniphobic agent (e.g., untreated surface).

In some embodiments, the wettability of a material (e.g., a solid surface) may be determined by measuring a contact angle of a liquid on a solid surface (e.g., omniphobic surfaces; treated surfaces). Any suitable methodology may be employed for measuring the liquid contact angle. For example, an optical tensiometer and/or a force tensiometer may be employed for measuring the liquid contact angle. For purposes of the disclosure herein, surfaces having a liquid contact angle of equal to or greater than about 90°, alternatively equal to or greater than about 100°, alternatively equal to or greater than about 110°, alternatively equal to or greater than about 120°, alternatively equal to or greater than about 130°, alternatively equal to or greater than about 140°, alternatively equal to or greater than about 150°, alternatively equal to or greater than about 160°, alternatively equal to or greater than about 170°, alternatively equal to or greater than about 175°, alternatively equal to or greater than about 179°, or alternatively about 180° are considered omniphobic surfaces (e.g., treated surfaces); wherein the liquid can be an aqueous liquid and/or an oleaginous liquid. In some embodiments, an omniphobic surface (e.g., treated surface) can be characterized by a liquid contact angle of equal to or greater than about 150°, wherein the liquid can be an aqueous liquid and/or an oleaginous liquid. In general, the higher the liquid contact angle, the lower the wettability.

Nonlimiting examples of the omniphobic agent 25 suitable for use in the present disclosure include solvated silicon dioxide (e.g., silicon dioxide solvated in any suitable solvent, such as ethanol), an organo-siloxane, a fluoropolymer, a fluorinated compound, a tetrafluoroethylene/(perfluoroalkyl or PFA) vinyl ether copolymer, a perfluoroalkyl phosphate, a perfluoroalkyl ethyl methacrylate, a fluorinated hydrocarbon, a polyfluoroalkylethyl methacrylate/alkylmethacrylate copolymer, perfluoroalcohol phosphate, a perfluoroalcohol phosphate/polysiloxane mixture, a perfluoroalcohol phosphate/acrylate silicone copolymer mixture, a tetrafluoroethylene/hexafluoropropylene copolymer (FEP), polytetrafluoroethylene (PTFE; Teflon), polyxylylene (Parylene), a fluorinated polyhedral oligomeric silsequioxane, an alkoxysilane, a chlorosilane, a fluorosilane, a perfluoroalkylsilane, a fluorosilane having a urethane linkage, a fluorosilane having its silicone part partially modified with fluorine or fluoride, a fluorosiloxane, a fluoroalkylsilane, a fluorosilazane, and the like, or combinations thereof. Without being limited by theory, certain omniphobic agents are not necessarily hydrophobic (e.g., silicon dioxide may be hydrophilic). However, when contacted with a surface (e.g., deposited on a surface), such omniphobic agents may render the surface omniphobic by creating a "texture" on the surface at nano-scale and/or micro-scale, wherein the texture can provide for repelling both aqueous liquids and oleaginous liquids.

In some embodiments, the omniphobic agent 25 can comprise a compound characterized by Structure I:

$$CF_3—(CF_2)_n—R—SiX_pCl_{3-p} \quad \text{Stricture I}$$

wherein the repeating ($—CF_2—$) unit may occur n times with the value of n ranging from about 0 to about 25, alternatively from about 1 to about 20, or alternatively from about 2 to about 15; wherein R can be an alkyl group, an alkylene group (e.g., ethylene group), an alkyne group (an acetylene group), a substituted functional group comprising a silicon atom and/or an oxygen atom, a substituted functional group comprising a silicon atom and/or a hydrogen atom, or chemical bond (e.g., a covalent bond); wherein X can be H or a functional group selected from the group consisting of an alkyl group, a cycloalkyl group, an aryl group, an alkoxyl group, and the like, derivatives thereof, or combinations thereof and wherein p can be 0, 1, or 2. The compound characterized by Structure I is a chlorosilane which may contain fluorocarbon groups (when n has a value other than 0). The term "derivative" herein as it relates to a functional group is defined to include any derived group that is made from one or more of the functional groups, for example, by replacing one atom in the functional group with another atom or group of atoms, rearranging two or more atoms in the functional group, ionizing a functional group, or creating a salt of a functional group.

Nonlimiting examples of chlorosilanes suitable for use as omniphobic agents 25 in the present disclosure include a chlorosilane characterized by Structure I, a chlorosilane characterized by Structure II, a chlorosilane characterized by Structure III, a chlorosilane characterized by Structure IV, a chlorosilane characterized by Structure V, a chlorosilane characterized by Structure VI, a chlorosilane characterized by Structure VII, a chlorosilane characterized by Structure VIII, a chlorosilane characterized by Structure IX, and the like, or combinations thereof.

$$CF_3—(CF_2)_7—(CH_2)_2—SiCl_3 \quad \text{Structure II}$$

$$CF_3—(CF_2)_7—(CH_2)_9—SiCl_3 \quad \text{Structure III}$$

$$CF_3—(CF_2)_5—(CH_2)_2—SiCl_3 \quad \text{Structure IV}$$

$$CF_3—CH_2—O—(CH_2)_{15}—SiCl_3 \quad \text{Structure V}$$

$$CF_3—(CH_2)_2—Si(CH_3)_2—(CH_2)_9—SiCl_3 \quad \text{VI}$$

$$CF_3—(CH_2)_2—Si(CH_3)_2—(CH_2)_{15}—SiCl_3 \quad \text{VII}$$

$$F—(CF_2)_4—(CH_2)_2—Si(CH_3)_2—(CH_2)_9—SiCl_3 \quad \text{Structure VIII}$$

$$CF_3—COO—(CH_2)_{15}—SiCl_3 \quad \text{Structure IX}$$

In some embodiments, the omniphobic agent 25 can comprise a compound characterized by Structure X:

$$CF_3—(CF_2)_m—R—SiZ_q(OA)_{3-q} \quad \text{Structure X}$$

wherein the repeating ($—CF_2—$) unit may occur n times with the value of n ranging from about 0 to about 25, alternatively from about 1 to about 20, or alternatively from about 2 to about 15; wherein R can be an alkyl group, an alkylene group (e.g., ethylene group), an alkyne group (an acetylene group), a substituted functional group comprising a silicon atom and/or an oxygen atom, a substituted functional group comprising a silicon atom and/or a hydrogen atom, or chemical bond (e.g., a covalent bond); wherein Z can be H or a functional group selected from the group consisting of an alkyl group, a cycloalkyl group, an aryl group, and the like, derivatives thereof, or combinations thereof; wherein OA is an alkoxy group with A representing a hydrogen atom or an alkyl group; and wherein q can be 0, 1, or 2. The compound characterized by Structure I is an alkoxysilane which may contain fluorocarbon groups (when n has a value other than 0).

Nonlimiting examples of alkoxysilanes suitable for use as omniphobic agents 25 in the present disclosure include an alkoxysilane characterized by Structure X, an alkoxysilane characterized by Structure XI, an alkoxysilane characterized by Structure XII, an alkoxysilane characterized by Structure XIII, an alkoxysilane characterized by Structure XIV, an alkoxysilane characterized by Structure XV, and the like, or combinations thereof.

$$CF_3—(CF_2)_5—(CH_2)_2—Si(OC_2H_5)_3 \quad \text{Structure XI}$$

$$CF_3—CH_2—O—(CH_2)_{15}—Si(OCH_3)_3 \quad \text{Structure XII}$$

$$CF_3—(CH_2)_2—Si(CH_3)_2—(CH_2)_{15}—Si(OCH_3)_3 \quad \text{Structure XIII}$$

$$CF_3—(CF_2)_3—(CH_2)_2—Si(CH_3)_2—(CH_2)_9—Si(OCH_3)_3 \quad \text{Structure XIV}$$

$$CF_3—COO—(CH_2)_{15}—Si(OC_2H_5)_3 \quad \text{XV}$$

Chlorosilanes and alkoxysilanes suitable for use in the present disclosure as omniphobic agents (e.g., omniphobic agent 25) are described in more detail in U.S. Pat. Nos. 5,571,622 and 5,324,566; each of which is incorporated by reference herein in its entirety.

In some embodiments, the omniphobic agent 25 can be present in the omniphobic emulsion in an amount of from about 0.01 wt. % to about 10 wt. %, alternatively from about 0.01 wt. % to about 5 wt. %, alternatively from about 0.01 wt. % to about 3 wt. %, alternatively from about 0.05 wt. % to about 2.5 wt. %, alternatively from about 0.1 wt. % to about 2 wt. %, alternatively from about 0.5 wt. % to about 1.5 wt. %, alternatively from about 0.05 wt. % to about 10 wt. %, alternatively from about 0.1 wt. % to about 7.5 wt. %, or alternatively from about 1 wt. % to about 5 wt. %, based on the total weight of the omniphobic emulsion.

In some embodiments, the omniphobic emulsion may comprise non-aqueous discontinuous phase droplets 20 having a droplet size of less than about 100 micrometers (μm), alternatively less than about 90 μm, alternatively less than about 75 μm, alternatively less than about 50 μm, alternatively less than about 25 μm, alternatively less than about 10 μm, alternatively less than about 1 μm, alternatively less than about 900 nanometers (nm), alternatively less than about 750 nm, alternatively less than about 500 nm, alternatively from equal to or greater than about 10 nm to less than about 100 μm, alternatively from about 50 nm to about 90 μm, alternatively from about 100 nm to about 75 μm. For purposes of the disclosure herein, the droplet size refers to the largest dimension of any two-dimensional cross section through the droplet.

In some embodiments, the omniphobic emulsion is an omniphobic microemulsion, wherein the non-aqueous discontinuous phase droplets 20 can be characterized by a droplet size of from equal to or greater than about 1 μm to less than about 100 μm, alternatively from about 5 μm to about 90 μm, or alternatively from about 10 μm to about 75 μm.

In some embodiments, the omniphobic emulsion is an omniphobic nanoemulsion, wherein the non-aqueous discontinuous phase droplets 20 can be characterized by a droplet size of from equal to or greater than about 10 nm to less than about 1 μm, alternatively from about 20 nm to about 900 nm, alternatively from about 50 nm to about 75 nm, or alternatively from about 100 nm to about 500 nm.

In some embodiments, the omniphobic emulsion as disclosed herein can be optically transparent. Generally, a transparent or optically transparent material allows light to pass through the material without being scattered. Typically, transparency can be assessed visually, or by optical microscopy. Without being limited by theory, owing to the relatively small droplet size (e.g., less than about 100 μm) and/or the small amount of droplets (e.g., about 10 wt. %, based on the total weight of the omniphobic emulsion) in the omniphobic emulsion, the omniphobic emulsion may appear transparent owing to a relatively small (e.g., insignificant) amount of light scattering.

In some embodiments, the omniphobic emulsion as disclosed herein can be optically translucent (e.g., partially transparent, semi-transparent). Generally, a translucent or optically translucent material allows light to pass through, although a portion of the light is being scattered. Typically, translucency can be assessed visually, or by optical microscopy.

In some embodiments, the omniphobic emulsion can be optically isotropic. Generally, optically isotropic materials (e.g., solutions, crystals, etc.) are transparent materials that display the same optical behavior in all spatial directions.

In some embodiments, the omniphobic emulsion as disclosed herein may be a stable emulsion (e.g., kinetically stable emulsion). Without being limited by theory, emulsions are by definition thermodynamically unstable (i.e., emulsions tend to separate in order to reduce the interfacial area); however, emulsion can be kinetically stable (i.e., emulsions can be stable over a period of time). Generally, emulsion stability can be determined by using any suitable methodology, such as light scattering measurements, reflectance measurements, dielectric constant measurements, visual observation of phase separation, etc.

In some embodiments, the omniphobic emulsion as disclosed herein may be stable over a time period of equal to or greater than about 1 hour, alternatively equal to or greater than about 6 hours, alternatively equal to or greater than about 12 hours, alternatively equal to or greater than about 24 hours, alternatively equal to or greater than about 48 hours, alternatively equal to or greater than about 72 hours, alternatively equal to or greater than about 96 hours, alternatively equal to or greater than about 1 week, alternatively equal to or greater than about 1 month, alternatively equal to or greater than about 3 months, or alternatively equal to or greater than about 6 months. Omniphobic microemulsions are typically more stable than omniphobic nanoemulsions, owing to less interfacial area in the microemulsions than in the nanoemulsions (per the same amount of emulsified omniphobic agent).

Figure 1B:
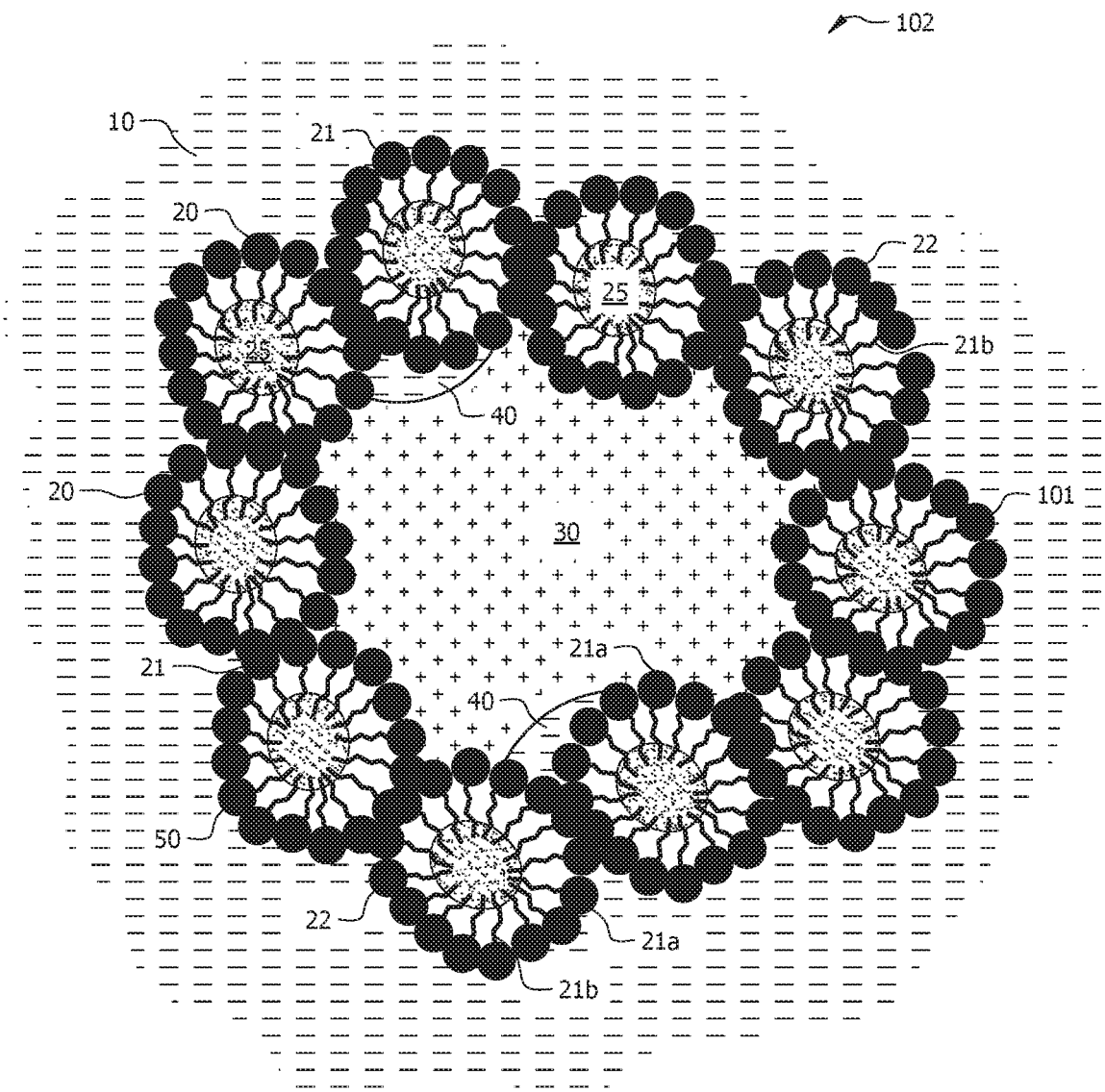
FIG. 1B displays a schematic of a cross-section through a discontinuous gas phase pore enclosed by a shell formed of non-aqueous discontinuous phase droplets in a foamed omniphobic emulsion.

In some embodiments, the omniphobic emulsion as disclosed herein can be a foamed omniphobic emulsion. In some embodiments, for example as depicted in FIG. 1B which displays a schematic of a cross-section 102 through a discontinuous gas phase pore enclosed by a shell formed of non-aqueous discontinuous phase droplets (depicted as schematics of cross-sections 101 of non-aqueous discontinuous phase droplets) in a foamed omniphobic emulsion, a foamed omniphobic emulsion as disclosed herein can comprise an aqueous continuous phase 10 having dispersed therein a plurality of non-aqueous discontinuous phase droplets 20 and a plurality of discontinuous gas phase pores 30.

For purposes of the disclosure herein, all descriptions related to the omniphobic emulsion (such as descriptions of the aqueous continuous phase 10, surfactant 21, omniphobic agent 25, non-aqueous discontinuous phase droplets 20, etc.) can be applied to the corresponding components of the foamed omniphobic emulsion, unless otherwise specified herein. The foamed omniphobic emulsion is an omniphobic emulsion further comprising gas pores. Further, for purposes of the disclosure herein, the term "omniphobic emulsion" encompasses both foamed omniphobic emulsion (emulsion comprising gas pores) and non-foamed omniphobic emulsions (emulsion without gas pores), unless otherwise specified herein.

In some embodiments, the foamed omniphobic emulsion as disclosed herein can be characterized by a porosity equal to or greater than about 5 vol. %, alternatively equal to or greater than about 10 vol. %, alternatively equal to or greater than about 25 vol. %, alternatively equal to or greater than about 50 vol. %, alternatively equal to or greater than about 75 vol. %, alternatively equal to or greater than about 90 vol. %, alternatively from about 10 vol. % to about 99 vol. %, alternatively from about 51 vol. % to about 99 vol. %, or alternatively from about 90 vol. % to about 98 vol. %, based on the total volume of the foamed omniphobic emulsion; wherein the porosity may be determined by pycnometry/porosimetry. Generally, the porosity of a material is defined as the percentage of volume that the pores (i.e., voids, empty spaces) occupy based on the total volume of the material. The porosity of the foamed omniphobic emulsion may be determined using a porosity tester or porosimeter.

In some embodiments, the discontinuous gas phase pores 30 can be characterized by a pore size that is greater than the droplet size (e.g., size of the non-aqueous discontinuous phase droplets 20). In some embodiments, the discontinuous gas phase pores 30 can be characterized by a pore size of equal to or greater than about 50 nm, alternatively equal to or greater than about 100 nm, alternatively equal to or greater than about 500 nm, alternatively equal to or greater than about 1 μm, alternatively equal to or greater than about 10 μm, alternatively equal to or greater than about 50 μm, alternatively equal to or greater than about 100 μm, alternatively equal to or greater than about 500 μm, alternatively equal to or greater than about 1,000 μm, alternatively equal to or greater than about 2,000 μm, or alternatively equal to or greater than about 5,000 μm; for example as determined by dual beam focused ion beam/scanning electron microscopy (FIB/SEM) and image analysis. For purposes of the disclosure herein, the pore size refers to the largest dimension of any two-dimensional cross section through the pore.

In some embodiments, the discontinuous gas phase pores 30 can comprise a gas, such as nitrogen, carbon dioxide, methane, propane, natural gas, and the like, or combinations thereof.

In some embodiments, for example as depicted in FIG. 1B, at least a portion of the non-aqueous discontinuous phase droplets 20 can be disposed at a gas-liquid interface 40 between the aqueous continuous phase 10 and the plurality of discontinuous gas phase pores 30, thereby forming a plurality of non-aqueous discontinuous phase shells 50; wherein each of the plurality of non-aqueous discontinuous phase shells 50 encloses a discontinuous gas phase pore 30.

In some embodiments, the non-aqueous discontinuous phase shell 50 can comprise a single complete shell layer (e.g., a shell layer that fully encloses the discontinuous gas phase pore 30, for example as depicted in FIG. 1B) disposed at the gas-liquid interface 40. For example, when the gas pore has an about spherical shape, the complete shell layer can have an about spherical shape as well.

In other embodiments, the non-aqueous discontinuous phase shell 50 can comprise a single partial shell layer (e.g., a shell layer that encloses only partially the discontinuous gas phase pore 30, for example as depicted in FIG. 1B) disposed at the gas-liquid interface 40. For example, when the gas pore has an about spherical shape, the partial shell layer can have the shape of a spherical cap and/or the shape of a spherical zone.

In yet other embodiments, the non-aqueous discontinuous phase shell 50 can comprise two or more shell layers, wherein the two or more shell layers can comprise a complete shell layer and/or a partial shell layer disposed in any suitable configuration at the gas-liquid interface 40.

In some embodiments, a portion of the discontinuous gas phase pores 30 may not be enclosed by a non-aqueous discontinuous phase shell 50. Depending on the porosity of the foam (e.g., the amount and/or size of the discontinuous gas phase pores 30), the amount and/or size of the non-aqueous discontinuous phase droplets 20 (e.g., the amount of surfactant 21, the amount of omniphobic agent 25), the presence or absence of additives in the aqueous continuous phase 10 (e.g., the amount of additives in the aqueous continuous phase 10), etc.

Further, a portion of the non-aqueous discontinuous phase droplets 20 in the foamed omniphobic emulsion may not be disposed at the gas-liquid interface 40; e.g., a portion of the non-aqueous discontinuous phase droplets 20 may be suspended in the aqueous continuous phase 10.

An omniphobic emulsion of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, clean, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water. In some embodiments, the WSF comprising an omniphobic emulsion as disclosed herein can be selected from the group consisting of a fracturing fluid, a pad fluid, a gravel packing fluid, a completion fluid, a stimulation fluid, a spacer fluid, a workover fluid, a drill-in fluid, and a drilling fluid.

In some embodiments, the WSF can comprise a base fluid, the omniphobic emulsion as disclosed herein, and optionally one or more additives.

In some embodiments, the WSF comprises a base fluid (e.g., a carrier fluid). In some embodiments, the base fluid is an aqueous fluid. In other embodiments, the base fluid comprises an emulsion other than the omniphobic emulsion.

In some embodiments, the base fluid comprises an aqueous fluid (e.g., aqueous base fluid). As will be appreciated by one of skill in the art, and with the help of this disclosure, when the WSF comprises an omniphobic emulsion, the aqueous base fluid of the WSF and the aqueous continuous phase 10 of the omniphobic emulsion are the same fluid.

Aqueous fluids that may be used in the WSF include any aqueous fluid suitable for use in subterranean applications, provided that the aqueous fluid is compatible with the omniphobic emulsion used in the WSF. For example, the aqueous fluid may comprise water or a brine. In some embodiments, the aqueous fluid comprises an aqueous brine. In such embodiments, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids comprising water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In some embodiments, the salt or salts in the water may be present within the base fluid in an amount sufficient to yield a saturated brine. The type and concentration of salt solutions utilized as a base fluid depends on the WSF density (e.g., drilling fluid density, completion fluid density, clean-up fluid density, etc.), which may range from about 8 lb/gallon to about 20 lb/gallon, alternatively from about 10 lb/gallon to about 18 lb/gallon, or alternatively from about 12 lb/gallon to about 16 lb/gallon.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to brines comprising NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In some embodiments, the base fluid comprises a brine.

In some embodiments, the base fluid comprises an emulsion other than the omniphobic emulsion as disclosed herein. In such embodiments, the emulsion (other than the omniphobic emulsion) is an oil-in-water emulsion comprising a non-oleaginous (e.g., an aqueous fluid of the type previously described herein) continuous phase and an oleaginous (e.g., an oil-based fluid or oleaginous fluid) discontinuous phase. Oleaginous fluids that may be used in the base fluid emulsions (other than the omniphobic emulsions) include any oleaginous fluid suitable for use in subterranean applications. Examples of oleaginous fluids suitable for use in a base fluid emulsion (other than the omniphobic emulsion) include, but are not limited to, petroleum oils, natural oils, synthetically-derived oils, oxygenated fluids, or combinations thereof. In some embodiments, the oleaginous fluid comprises diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

The base fluid may be present within the WSF in an amount of from about 10 wt. % to about 99 wt. %, alternatively from about 20 wt. % to about 95 wt. %, or alternatively from about 30 wt. % to about 90 wt. %, based on the total weight of the WSF. Alternatively, the base fluid may comprise the balance of the WSF after considering the amount of the other components used.

The WSF may further comprise additional additives as deemed appropriate for improving the properties of the fluid. Such additives may vary depending on the intended use of the fluid in the wellbore. Examples of such additives include, but are not limited to suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, carbon fibers, glass fibers, metal fibers, minerals fibers, and the like, or combinations thereof. These additives may be introduced singularly or in combination using any suitable methodology and in amounts effective to produce the desired improvements in the properties of the WSF. As will be appreciated by one of skill in the art with the help of this disclosure, any of the components and/or additives used in the WSF have to be compatible with the omniphobic emulsion used in the WSF composition.

In some embodiments, the omniphobic emulsion as disclosed herein may be included within the WSF in a suitable or effective amount (e.g., an amount effective to provide desired omniphobic properties to a surface that the WSF contacts). The resultant amount of omniphobic emulsion that is necessary to impart desired omniphobic properties to a surface that comes in contact with the WSF may be dependent upon a variety of factors such as the composition of the WSF; the type of surfactant and/or omniphobic agent present in the omniphobic emulsion; the amount of surfactant and/or omniphobic agent present in the omniphobic emulsion; the presence or absence of various additives in the WSF; the intended wellbore location where the WSF is expected to impart desired omniphobic properties to a surface that comes in contact with the WSF; the composition of the formation; the pressure of the formation; the temperature of the formation; the diameter of the hole; and the like; or combinations thereof.

In some embodiments, an omniphobic emulsion as disclosed herein may be present in the WSF in an amount effective to provide for an amount of surfactant 21 in the WSF of from about 0.01 wt. % to about 3 wt. %, alternatively from about 0.0 5 wt. % to about 2.5 wt. %, alternatively from about 0.1 wt. % to about 2 wt. %, or alternatively from about 0.5 wt. % to about 1.5 wt. %, based on the total weight of the WSF.

In some embodiments, an omniphobic emulsion as disclosed herein may be present in the WSF in an amount effective to provide for an amount of omniphobic agent 25 in the WSF of from about 0.01 wt. % to about 3 wt. %, alternatively from about 0.05 wt. % to about 2.5 wt. %, alternatively from about 0.1 wt. % to about 2 wt. %, or alternatively from about 0.5 wt. % to about 1.5 wt. %, based on the total weight of the WSF.

The omniphobic emulsion as disclosed herein can be made by using any suitable methodology. In some embodiments, a method of making the omniphobic emulsion as disclosed herein can comprise contacting an aqueous fluid, a surfactant and an omniphobic agent under a shear rate of from about $10 \ s^{-1}$ to about $50,000 \ s^{-1}$, alternatively from about $100 \ s^{-1}$ to about $45,000 \ s^{-1}$, alternatively from about $1,000 \ s^{-1}$ to about $40,000 \ s^{-1}$, alternatively from about $5,000 \ s^{-1}$ to about $35,000 \ s^{-1}$, or alternatively from about $1,000 \ s^{-1}$ to about $30,000 \ s^{-1}$ to form the omniphobic emulsion. Without being limited by theory, omniphobic emulsion as disclosed herein "self-assemble" by forming the non-aqueous discontinuous phase droplets 20 (for example as shown in FIGS. 1A-1B) when contacting the aqueous fluid (e.g., aqueous continuous phase 10), the surfactant (e.g., surfactant 21) and the omniphobic agent (e.g., omniphobic agent 25) under high shear (e.g., a shear rate of from about $10 \ s^{-1}$ to about $50,000 \ s^{-1}$).

In some embodiments, the shear rate of from about $10 \ s^{-1}$ to about $50,000 \ s^{-1}$ can be provided by using any suitable methodology, for example by employing a blender, a mixer, a downhole mixer, an in-line mixer, jetting, and the like, or combinations thereof.

The components used to prepare the omniphobic emulsion (e.g., an aqueous fluid, a surfactant, an omniphobic agent) can be contacted with each other in any suitable order, wherein the shear rate of from about $10 \ s^{-1}$ to about $50,000 \ s^{-1}$ can be provided at any suitable stage of mixing the components.

For example, all components used to prepare the omniphobic emulsion (e.g., an aqueous fluid, a surfactant, an omniphobic agent) can be contacted about simultaneously under the shear rate of from about $10 \ s^{-1}$ to about $50,000 \ s^{-1}$, thereby forming the omniphobic emulsion. As another example, all components used to prepare the omniphobic emulsion (e.g., an aqueous fluid, a surfactant, an omniphobic agent) can be contacted about simultaneously to form a mixture; followed by applying the shear rate of from about $10 \ s^{-1}$ to about $50,000 \ s^{-1}$ to the mixture, thereby forming the omniphobic emulsion.

As yet another example, the surfactant and the omniphobic agent can be contacted to form a first mixture (without applying shear); followed by contacting the first mixture with the aqueous fluid under the shear rate of from about $10 \ s^{-1}$ to about $50,000 \ s^{-1}$, thereby forming the omniphobic emulsion. As still yet another example, the surfactant and the omniphobic agent can be contacted to form a first mixture under the shear rate of from about $10 \ s^{-1}$ to about $50,000 \ s^{-1}$; followed by contacting the first mixture with the aqueous fluid under the shear rate of from about $10 \ s^{-1}$ to about $50,000 \ s^{-1}$, thereby forming the omniphobic emulsion. As still yet another example, the surfactant and the aqueous fluid can be contacted to form a surfactant aqueous solution (without applying shear); followed by contacting the surfactant aqueous solution with the omniphobic agent under the shear rate of from about $10 \ s^{-1}$ to about $50,000 \ s^{-1}$, thereby forming the omniphobic emulsion. As still yet another example, the surfactant and the aqueous fluid can be contacted to form a surfactant aqueous solution under the shear rate of from about $10 \ s^{-1}$ to about $50,000 \ s^{-1}$; followed by contacting the surfactant aqueous solution with the omniphobic agent under the shear rate of from about $10 \ s^{-1}$ to about $50,000 \ s^{-1}$, thereby forming the omniphobic emulsion.

In some embodiments, a method of making the omniphobic emulsion foam as disclosed herein can further comprise contacting a foam precursor with the aqueous fluid, the surfactant and the omniphobic agent under a shear rate of from about 10 s$^{-1}$ to about 50,000 s$^{-1}$. The shear rate of from about 10 s$^{-1}$ to about 50,000 s$^{-1}$ can be provided by using any suitable methodology, for example by employing a blender, a mixer, a downhole mixer, an in-line mixer, jetting, and the like, or combinations thereof.

In some embodiments, the foam precursor can be selected from the group consisting of nitrogen, carbon dioxide, methane, propane, natural gas, liquefied natural gas (LNG), and combinations thereof. For purposes of the disclosure herein, the foam precursor refers to any suitable compound that can provide for forming the omniphobic emulsion foam. For example, LNG may be contacted as a liquid with the aqueous fluid, the surfactant and the omniphobic agent, wherein the LNG may phase change from a liquid (liquefied natural gas) to a gas (natural gas), thereby providing for the formation of the omniphobic emulsion foam, e.g., the formation of the gas pores (containing natural gas) within the omniphobic emulsion foam. As another example, natural gas may be contacted as a gas with (e.g., bubbled as a gas through) the aqueous fluid, the surfactant and the omniphobic agent, wherein the natural gas provides for the formation of the omniphobic emulsion foam, e.g., the formation of the gas pores (containing natural gas) within the omniphobic emulsion foam.

The components used to prepare the omniphobic emulsion foam (e.g., an aqueous fluid, a surfactant, an omniphobic agent, a foam precursor) can be contacted with each other in any suitable order, wherein the shear rate of from about 10 s$^{-1}$ to about 50,000 s$^{-1}$ can be provided at any suitable stage of mixing the components.

For example, all components used to prepare the omniphobic emulsion foam (e.g., an aqueous fluid, a surfactant, an omniphobic agent, a foam precursor) can be contacted about simultaneously under the shear rate of from about 10 s$^{-1}$ to about 50,000 s$^{-1}$, thereby forming the omniphobic emulsion foam. The liquid components (e.g., an aqueous fluid, a surfactant, an omniphobic agent) can be contacted with each other under the shear rate of from about 10 s$^{-1}$ to about 50,000 s$^{-1}$ while the foam precursor is introduced into the liquid components mixture.

As another example, a non-foamed omniphobic emulsion can be formed first as previously described herein; followed by introducing the foam precursor under the shear rate of from about 10 s$^{-1}$ to about 50,000 s$^{-1}$ to the non-foamed omniphobic emulsion, thereby forming the omniphobic emulsion foam.

As yet another example, all components used to prepare the omniphobic emulsion foam (e.g., an aqueous fluid, a surfactant, an omniphobic agent, a foam precursor) can be contacted about simultaneously to form a foamed mixture; followed by applying the shear rate of from about 10 s$^{-1}$ to about 50,000 s$^{-1}$ to the foamed mixture, thereby forming the omniphobic emulsion foam. Applying the shear rate of from about 10 s$^{-1}$ to about 50,000 s$^{-1}$ to the foamed mixture may increase the stability of the foam mixture, e.g., may prevent the collapsing of the foam. Further, and without being limited by theory, bubbling a gas (e.g., a foam precursor) through a liquid mixture containing a surfactant will create a foam.

In some embodiments, a method of servicing a wellbore in a subterranean formation can comprise preparing a WSF comprising an omniphobic emulsion as disclosed herein.

In some embodiments, the WSF comprising the omniphobic emulsion as disclosed herein may be prepared using any suitable method or process. The components of the WSF (e.g., omniphobic emulsion, base fluid, additives, etc.) may be combined and mixed in by using any mixing device compatible with the composition, e.g., a mixer, a batch mixer, a batch mixer with impellers and/or paddles, a blender, a batch blender, single ribbon type blenders, double ribbon type blenders, horizontal blenders, vertical blenders, inclined blenders, single or double ribbon type blenders which could further be horizontal, vertical or inclined, mixing eductors, circulation loops, inline static mixers, and the like, or any suitable combination thereof. In embodiments where the WSF is prepared concurrently with forming the omniphobic emulsion (e.g., the omniphobic emulsion forms in the WSF while preparing the WSF, wherein the aqueous fluid of the WSF is the aqueous continuous phase 10 of the omniphobic emulsion), the components of the WSF comprising the omniphobic emulsion can be subjected to the shear rate of from about 10 s$^{-1}$ to about 50,000 s$^{-1}$ by using any suitable methodology, for example by employing a blender, a mixer, a downhole mixer, an in-line mixer, jetting, and the like, or combinations thereof.

In some embodiments, the components of the WSF comprising the omniphobic emulsion are combined at the well site; alternatively, the components of the WSF comprising the omniphobic emulsion are combined off-site and are transported to and used at the well site. In other embodiments, some of the components of the WSF comprising the omniphobic emulsion are combined off-site (e.g., the omniphobic emulsion) and are transported to the well site, where they are further combined with the remainder of the components of the WSF (e.g., WSF comprising a base fluid and optional additives), thus providing for the WSF comprising the omniphobic emulsion to be used at the well site. The resulting WSF comprising the omniphobic emulsion may be pumped downhole where it may function as intended (e.g., impart omniphobic properties to a surface that it comes in contact with). In yet other embodiments, the WSF comprising the omniphobic emulsion may be formed in situ downhole in a wellbore.

A WSF comprising an omniphobic emulsion as disclosed herein may be used for imparting omniphobic properties to a surface (e.g., downhole surface) that it comes in contact with in any suitable stage of a wellbore's life, such as for example, during a drilling operation, completion operation, stimulation operation, fracturing operation, production stage, clean-up operation, etc.

In some embodiments, the omniphobic emulsion and the WSF may be prepared separately, followed by combining the omniphobic emulsion and the WSF to form the WSF comprising the omniphobic emulsion. The omniphobic emulsion may be added to the WSF (e.g., may be contacted with the WSF) in a fashion similar to adding any suitable additive to the WSF. In such embodiments, the aqueous fluid, the surfactant and the omniphobic agent can be contacted (i) off-site, followed by transporting at least a portion of the omniphobic emulsion to a well site; or (ii) on location at a well site, where the omniphobic emulsion may be contacted with the WSF to form the WSF comprising the omniphobic emulsion. In some embodiments where the omniphobic emulsion is prepared off-site, the WSF may also be prepared off-site; wherein the omniphobic emulsion and the WSF are contacted off-site to form the WSF comprising the omniphobic emulsion; followed by transporting at least a portion of the WSF comprising the omniphobic emulsion to a well site. In other embodiments where the omniphobic emulsion is prepared off-site, at least a portion of the omniphobic emulsion may be transported to a well site where it may be contacted with the WSF or with components of the WSF to form the WSF comprising the omniphobic emulsion.

In some embodiments where the omniphobic emulsion and the WSF are contacted at a well site, the WSF comprising the omniphobic emulsion may be prepared above the ground (i.e., on location at a well site), followed by pumping the WSF comprising the omniphobic emulsion downhole, where it may function as intended (e.g., impart omniphobic properties to a surface that it comes in contact with). In other embodiments where the omniphobic emulsion and the WSF are contacted at a well site, the WSF comprising the omniphobic emulsion may be prepared in situ downhole in a wellbore and/or subterranean formation, for example by employing a downhole mixer, an in-line mixer, jetting, and the like, or combinations thereof.

In some embodiments, the omniphobic emulsion may be prepared first, followed by using the omniphobic emulsion as an additive during the preparation of the WSF comprising the omniphobic emulsion. In such embodiments, the aqueous fluid, the surfactant and the omniphobic agent can be contacted (i) off-site; or (ii) on location at a well site. In some embodiments where the omniphobic emulsion is prepared off-site, the WSF may also be prepared off-site; wherein the omniphobic emulsion is used to prepare the WSF comprising the omniphobic emulsion off-site; followed by transporting at least a portion of the WSF comprising the omniphobic emulsion to a well site. In other embodiments where the omniphobic emulsion is prepared off-site, at least a portion of the omniphobic emulsion may be transported to a well site where it may be contacted with the other suitable WSF components (e.g., aqueous fluid, additives, etc.) to form the WSF comprising the omniphobic emulsion.

In some embodiments where the omniphobic emulsion and the other WSF components are contacted at a well site, the WSF comprising the omniphobic emulsion may be prepared above the ground (i.e., on location at a well site), followed by pumping the WSF comprising the omniphobic emulsion downhole, where it may function as intended (e.g., impart omniphobic properties to a surface that it comes in contact with). In other embodiments where the omniphobic emulsion and the other WSF components are contacted at a well site, the WSF comprising the omniphobic emulsion may be prepared in situ downhole in a wellbore and/or subterranean formation.

In embodiments where the omniphobic emulsion is prepared separately, the omniphobic emulsion can be prepared as a concentrated "master batch" having an amount of non-aqueous discontinuous phase droplets 20 effective for providing a desired amount of non-aqueous discontinuous phase droplets 20 in the WSF comprising the omniphobic emulsion; e.g., effective for providing a desired amount of surfactant 21 and/or omniphobic agent 25 in the WSF comprising the omniphobic emulsion. For example, the WSF comprising the omniphobic emulsion can have from about 0.01 wt. % to about 3 wt. % surfactant 21, based on the total weight of the WSF comprising the omniphobic emulsion; and/or from about 0.01 wt. % to about 3 wt. % omniphobic agent 25, based on the total weight of the WSF comprising the omniphobic emulsion.

In embodiments where the omniphobic emulsion is prepared separately (e.g., master batch concentrated omniphobic emulsion), the omniphobic emulsion can comprise the surfactant 21 in an amount of from about 0.05 wt. % to about 10 wt. %, alternatively from about 0.1 wt. % to about 7.5 wt. %, or alternatively from about 1 wt. % to about 5 wt. %, based on the total weight of the omniphobic emulsion.

In embodiments where the omniphobic emulsion is prepared separately (e.g., master batch concentrated omniphobic emulsion), the omniphobic emulsion can comprise the omniphobic agent 25 in an amount of from about 0.05 wt. % to about 10 wt. %, alternatively from about 0.1 wt. % to about 7.5 wt. %, or alternatively from about 1 wt. % to about 5 wt. %, based on the total weight of the omniphobic emulsion.

In some embodiments, the WSF can be prepared concurrently with forming the omniphobic emulsion, wherein the omniphobic emulsion forms in the WSF while preparing the WSF, and wherein the aqueous fluid of the WSF is the aqueous continuous phase 10 of the omniphobic emulsion. In such embodiments, the WSF comprising the omniphobic emulsion can be prepared (i) off-site, followed by transporting at least a portion of the WSF comprising the omniphobic emulsion to a well site; (ii) above the ground on location at a well site; or (iii) in situ downhole in a wellbore and/or subterranean formation. In embodiments where the WSF comprising the omniphobic emulsion is prepared (i) off-site, followed by transporting at least a portion of the WSF comprising the omniphobic emulsion to a well site; or (ii) above the ground on location at a well site; the WSF comprising the omniphobic emulsion may be pumped downhole, where it may function as intended (e.g., impart omniphobic properties to a surface that it comes in contact with). In some embodiments, the WSF comprising the omniphobic emulsion can have from about 0.01 wt. % to about 3 wt. % surfactant 21, based on the total weight of the WSF comprising the omniphobic emulsion; and/or from about 0.01 wt. % to about 3 wt. % omniphobic agent 25, based on the total weight of the WSF comprising the omniphobic emulsion.

In some embodiments, a method of servicing a wellbore in a subterranean formation may comprise placing a WSF comprising the omniphobic emulsion as disclosed herein in the wellbore and/or subterranean formation to impart omniphobic properties to a downhole surface that it comes in contact with. In such embodiments, the WSF comprising the omniphobic emulsion (e.g., the omniphobic agent) may contact the downhole surface to form a treated downhole surface; wherein at least a portion of the treated downhole surface comprises the omniphobic agent; and wherein the treated downhole surface is characterized by decreased wettability when compared to the wettability of the same downhole surface prior to contacting with the omniphobic emulsion. When the omniphobic emulsion contacts a downhole surface, the non-aqueous discontinuous phase droplets 20 may also contact the downhole surface (for example by colliding into the downhole surface), wherein the integrity of the droplet outer layer 22 enclosing the omniphobic agent 25 is compromised (e.g., disrupted), thereby releasing at least a portion of the omniphobic agent 25, and wherein the omniphobic agent 25 contacts the downhole surface and forms the treated downhole surface. The integrity of the droplet outer layer 22 enclosing the omniphobic agent 25 may be compromised mechanically, for example by contact or collision between the non-aqueous discontinuous phase droplets 20 and a downhole surface. Further, the integrity of the droplet outer layer 22 enclosing the omniphobic agent 25 may be compromised chemically, for example by providing an emulsion breaker compound (e.g., pH modifier, salt, etc.) proximal to the downhole surface, wherein the emulsion breaker compound can contact the non-aqueous discontinuous phase droplets 20 and disrupt the droplet outer layer 22, thereby providing for releasing the omniphobic agent 25, wherein the omniphobic agent 25 contacts the downhole surface and forms the treated downhole surface. Furthermore, the integrity of the droplet outer layer 22 enclosing the omniphobic agent 25 may be compromised thermally, for example when a temperature proximal to the downhole surface is increased, wherein the increased temperature may provide for a modified viscosity of the aqueous continuous phase 10 and/or omniphobic agent 25, which in turn may alter the interfacial tension between the aqueous continuous phase 10 and the omniphobic agent 25, thereby disrupting the droplet outer layer 22 and releasing the omniphobic agent 25, wherein the omniphobic agent 25 contacts the downhole surface and forms the treated downhole surface. In some embodiments, at least a portion of the omniphobic agent can be bonded to the substrate via a chemical bond and/or a physical bond; wherein the chemical bond can be selected from the group consisting of an ionic bond, a covalent bond, combinations thereof; and wherein the physical bond can be selected from the group consisting of electrostatic interaction, van der Waals interaction, ionic interaction, hydrogen bonding, dipole-dipole interaction, and combinations thereof.

Nonlimiting examples of a downhole surface include a wellbore surface, a wellbore equipment surface, a near-wellbore region surface, a subterranean formation surface, a subterranean formation pore surface, a fracture surface, a natural fracture surface, an induced fracture face surface, a proppant surface, and the like, or combinations thereof.

Nonlimiting examples of a treated downhole surface include a treated wellbore surface, a treated wellbore equipment surface, a treated near-wellbore region surface, a treated subterranean formation surface, a treated subterranean formation pore surface, a treated fracture surface, a treated natural fracture surface, a treated induced fracture face surface, a treated proppant surface, and the like, or combinations thereof.

In some embodiments, a treated downhole surface may be characterized by a wettability that is decreased by at least equal to or greater than about 5%, alternatively at least equal to or greater than about 10%, alternatively at least equal to or greater than about 20%, alternatively at least equal to or greater than about 30%, alternatively at least equal to or greater than about 40%, alternatively at least equal to or greater than about 50%, alternatively at least equal to or greater than about 60%, alternatively at least equal to or greater than about 70%, alternatively at least equal to or greater than about 80%, alternatively at least equal to or greater than about 90%, alternatively at least equal to or greater than about 95%, or alternatively at least equal to or greater than about 99% when compared to the wettability of an otherwise similar downhole surface that has not been treated with an omniphobic agent (e.g., untreated downhole surface; downhole surface prior to treatment with an omniphobic agent).

In general, decreasing the wettability of a surface (e.g., treated surface, treated downhole surface) increases the flowability of liquids (i.e., the ability of a liquid to flow) over (e.g., across) such surface. Further, when liquids are not retained on a surface (e.g., owing to decreased wettability of the surface, such as a treated surface, treated downhole surface, etc.), the liquids can move through flowspaces having treated surfaces, as opposed to blocking (e.g., obturating, obstructing) flowspaces, thereby providing for a suitable flowpath (e.g., unobturated flowpath, unobstructed flowpath) for liquids (e.g., water, an aqueous liquid, a hydrophilic liquid, an aqueous WSF, oil, an oleaginous liquid, a hydrophobic liquid, an oleaginous WSF, etc.) and/or gases (e.g., natural gas), for example for recovery of such liquids and/or gases from the wellbore and/or subterranean formation. For example, when the flowpath of a liquid and/or gas to be recovered from a wellbore and/or subterranean formation entails a pore (e.g., a pore flowspace) in a subterranean formation, if the pore is blocked by a liquid that has accumulated in at least a portion of the pore, then the pore flowspace may be blocked, thus not allowing the flow of gases and/or liquids through the pore (e.g., pore flowspace). However, when such a pore in a subterranean formation has a treated pore surface (e.g., treated subterranean formation pore surface), liquid may not accumulate in the pore (e.g., pore flowspace), thereby allowing the flow of gases and/or liquids through the pore (e.g., pore flowspace).

In some embodiments, at least a portion of the wellbore and/or subterranean formation having a treated downhole surface can be characterized by increased fluid conductivity when compared to the fluid conductivity of the same wellbore and/or subterranean formation prior to contacting the downhole surface with the omniphobic emulsion. For purposes of the disclosure herein, the terms "conductivity," "fluid conductivity," and "wellbore conductivity" can be used interchangeably and refer to the ability of a flowpath in a wellbore and/or subterranean formation to conduct fluid (i.e., allow the flow of fluid). In general, the higher the conductivity, the more fluid can flow through a flowpath. Further, the less liquid blocking a flowpath or portion thereof, the higher the conductivity. Furthermore, the higher the conductivity, the more fluid can be recovered from the wellbore and/or subterranean formation. Generally, the higher the conductivity, the higher the production rate (e.g., the higher the fluid deliverability).

In some embodiments, natural gas and/or oil can be recovered from the wellbore and/or subterranean formation, wherein the amount of recovered natural gas and/or the amount of recovered oil is greater than an amount of natural gas and/or an amount of oil, respectively, recovered from an otherwise similar wellbore and/or subterranean formation that do not comprise a treated downhole surface.

In some embodiments, the treated downhole surface can provide for preventing and/or reducing the formation of a condensate bank in the wellbore and/or subterranean formation. Generally, gas condensate reservoirs display production problems associated with downhole pressure; e.g., when the pressure in the reservoir is reduced (e.g., falls, decreases) below a dew point, a liquid phase (e.g., liquid hydrocarbon phase) starts to condense and accumulate, thus forming a condensate bank; thereby reducing the conductivity. Without being limited by theory, the dew point refers to the combination of temperature and pressure where a gas becomes saturated with vapor, thereby providing for the condensation of the gas; wherein the lower the pressure, the lower the temperature at which a condensate forms. The treated downhole surface can provide for preventing the formation of a condensate bank in the wellbore and/or subterranean formation, for example by allowing (e.g., enabling) the flow of liquid over the treated downhole surface, thereby preventing the accumulation of liquid such as a condensate bank in the wellbore and/or subterranean formation. The treated downhole surface can provide for reducing (e.g., minimizing) the formation of a condensate bank in the wellbore and/or subterranean formation, for example by allowing (e.g., enabling) the flow of at least a portion of the liquid over the treated downhole surface, thereby reducing the accumulation of at least a portion of the liquid such as a condensate bank in the wellbore and/or subterranean formation.

In embodiments where the wellbore and/or subterranean formation comprise a condensate bank, the condensate bank can decrease the fluid conductivity of the wellbore and/or subterranean formation, wherein the treated downhole surface can provide for removing of at least a portion of the condensate bank from the wellbore and/or subterranean formation, thereby increasing the conductivity of fluid flowing into the wellbore from the subterranean formation.

In some embodiments, the WSF comprising the omniphobic emulsion as disclosed herein may be utilized in any suitable wellbore servicing operation.

In some embodiments, the WSF comprising the omniphobic emulsion as disclosed herein may be utilized in a wellbore servicing operation as a prophylactic treatment (i.e., a treatment applied prior to developing a condensate bank and/or any other undesired accumulation of liquid in the wellbore and/or subterranean formation); and/or a remedial treatment (i.e., a treatment applied subsequent to and/or during developing a condensate bank and/or any other undesired accumulation of liquid in the wellbore and/or subterranean formation).

In some embodiments, the subterranean formation may not have been fractured. In such embodiments, the downhole surface may be treated prior to a fracturing operation to yield the treated downhole surface, followed by subjecting the subterranean formation to a stimulation treatment (e.g., gravel packing operation, a fracturing operation), as will be described in more detail later herein.

In other embodiments, the downhole surface may be treated to yield the treated downhole surface; wherein the wellbore and/or subterranean formation may not be subjected to a fracturing operation. In such embodiments, the WSF may be a pad fluid, a spacer fluid, a particulate-free fluid, a proppant-free fluid, a gravel-free fluid, and the like, or combinations thereof. Generally, a pad fluid may be used in a stimulation treatment to initiate hydraulic fracturing, wherein the pad does not contain a proppant.

In some embodiments, the WSF comprising the omniphobic emulsion as disclosed herein may be introduced as a prophylactic treatment (e.g., injected, placed, circulated, etc.) in a region of interest in the wellbore and/or subterranean formation, such as a near-wellbore region; wherein the omniphobic emulsion contacts a downhole surface in the near-wellbore formation region, such as a near-wellbore region surface, to form the treated downhole surface (e.g., treated near-wellbore region surface), thereby preventing the formation and/or accumulation of a condensate bank and/or any other undesired accumulation of liquid in the wellbore and/or subterranean formation. In such embodiments, the subterranean formation may not include a fracture (e.g., fracturing may be undesirable and/or impractical). The WSF comprising the omniphobic emulsion as disclosed herein may permeate into (e.g., sip in, enter, penetrate, etc.) the near-wellbore region (e.g., rock, rock pores), thereby forming a treated downhole surface (e.g., treated formation surface, treated rock surface, treated pore surface, etc.) in the absence of a fracture.

In some embodiments, the WSF comprising the omniphobic emulsion as disclosed herein may be introduced as a remedial treatment (e.g., injected, placed, circulated, etc.) in a region of interest in the wellbore and/or subterranean formation, such as a near-wellbore region; wherein the omniphobic emulsion contacts a downhole surface in the near-wellbore formation region, such as a near-wellbore region surface, to form the treated downhole surface (e.g., treated near-wellbore region surface), thereby allowing for the removal of at least a portion of a condensate bank and/or any other undesired accumulation of liquid already present in the wellbore and/or subterranean formation. In such embodiments, the subterranean formation may exclude a fracture (e.g., a fracture may be undesirable and/or impractical). The WSF comprising the omniphobic emulsion as disclosed herein may permeate into (e.g., sip in, enter, penetrate, etc.) the near-wellbore region (e.g., rock, rock pores), thus forming a treated downhole surface (e.g., treated formation surface, treated rock surface, treated pore surface, etc.) and displacing a condensate bank and/or any other undesired accumulation of liquid already present in the near-wellbore region, thereby allowing for the removal of at least a portion of a condensate bank and/or any other undesired accumulation of liquid already present in the wellbore and/or subterranean formation. Without being limited by theory, the omniphobic agent that contacts a rock surface (e.g., a rock pore surface) may change the surface energy of the rock surface (e.g., surface energy of rock pore surface), thereby allowing for the flow of at least a portion of the liquid over the treated downhole surface, and reducing the accumulation of at least a portion of the liquid such as a condensate bank in the wellbore and/or subterranean formation.

In some embodiments, the WSF comprising the omniphobic emulsion as disclosed herein may be utilized in any suitable wellbore servicing operation, such as a stimulation treatment (e.g., gravel packing operation, a fracturing operation).

In some embodiments, the subterranean formation may comprise one or more fractures, wherein the treated downhole surface comprises a treated fracture face surface. In such embodiments, the fracture face surface can be treated to provide for the treated fracture face surface (i) during a fracturing operation (e.g., while the fracture face surface is created) and/or (ii) subsequent to the fracturing operation (e.g., subsequent to creating the fracture face surface).

In some embodiments, the wellbore service being performed can be a gravel packing operation, wherein a WSF comprising a particulate material (e.g., proppant, gravel, etc.) is placed (e.g., pumped downhole) in the formation. In such embodiments, the WSF is a gravel packing fluid, and may further comprise an omniphobic agent. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

During well stimulation treatments, such as fracturing treatments and/or gravel packing treatments, the WSF (e.g., the fracturing fluid and/or gravel packing fluid) can suspend a particulate material (e.g., proppant, gravel, etc.) and deposit the particulate material in a desired location, such as for example a fracture, inter alia, to maintain the integrity of such fracture once the hydraulic pressure is released. The WSF may further comprise an omniphobic agent. After the particulate material is placed in the fracture and pumping stops, the fracture closes. The pores (e.g., flowspaces, flowpaths) of the particulate material pack/bed and the surrounding formation are filled with the WSF (e.g., the fracturing fluid and/or gravel packing fluid) and should be cleaned out to maximize conductivity of the particulate material-filled space (e.g., a proppant-filled fracture, a gravel-filled fracture, or combinations thereof). When the particulate materials comprises a treated particulate material surface, a liquid (e.g., WSF, such as fracturing fluid and/or gravel packing fluid; condensate bank; undesired accumulated liquid; and the like; or combinations thereof) may flow easier over the treated downhole surface (e.g., treated particulate material surface), thereby allowing for the removal of at least a portion of such liquid.

In some embodiments, the WSF may comprise a particulate material (e.g., proppant, gravel, etc.). As used herein, a particulate material refers to a granular material that is suitable for use in a particulate pack (e.g., a proppant pack and/or a gravel pack). When deposited in a fracture, the particulate material may form a particulate pack (e.g., a proppant pack and/or a gravel pack) structure through which fluids may flow to the wellbore. The particulate material functions to prevent the fractures from closing due to overburden pressures.

In some embodiments, the particulate material may be comprised of a naturally-occurring material. Alternatively, the particulate material comprises a synthetic material. Alternatively, the particulate material comprises a mixture of a naturally-occurring and synthetic material.

In some embodiments, the particulate material comprises a proppant, which may form a proppant pack when placed in the wellbore and/or subterranean formation. In some embodiments, the proppant may comprise any suitable granular material, which may be used to prop fractures open, i.e., a propping agent or a proppant.

Nonlimiting examples of proppants suitable for use in this disclosure include silica (sand), desert sand, beach sand, graded sand, Ottawa sands, Brady sands, Colorado sands; resin-coated sands; dirt; soil; gravels; synthetic organic particles, nylon pellets, high density plastics, teflons, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; resin coated materials of the type described herein; or combinations thereof.

In some embodiments, the particulate material comprises a gravel, which may form a gravel pack when placed in the wellbore and/or subterranean formation. A "gravel pack" is a term commonly used to refer to a volume of particulate materials (such as gravel and/or sand) placed into a wellbore to at least partially reduce the migration of unconsolidated formation particulates into the wellbore. In some embodiments, the gravel pack comprises a proppant material of the type previously described herein.

The particulate materials may be of any suitable size and/or shape. In some embodiments, a particulate material suitable for use in the present disclosure may have an average particle size in the range of from about 2 to about 400 mesh, alternatively from about 8 to about 100 mesh, or alternatively from about 10 to about 70 mesh, U.S. Sieve Series. The particulate materials suitable for use in this disclosure comprise particles of any suitable geometry, including without limitation beads, spheres, ovals, fibers, rods, pellets, platelets, disks, plates, ribbons, and the like, or combinations thereof.

In some embodiments, the particulate material may be included within a WSF in a suitable amount. In some embodiments, the particulate material may be present within a WSF in an amount of from about 0.1 pounds per gallon (ppg) to about 28 ppg, alternatively from about 0.1 ppg to about 14 ppg, or alternatively from about 0.1 ppg to about 8 ppg, based on the total volume of the WSF.

In some embodiments, the WSF comprising the omniphobic emulsion as disclosed herein may be introduced as a prophylactic treatment (e.g., injected, placed, circulated, etc.) in a region of interest in the wellbore and/or subterranean formation, such as a near-wellbore region; wherein the near-wellbore region comprises a fracture having a fracture face surface; wherein the omniphobic emulsion contacts a downhole surface in the near-wellbore region, such as a fracture face surface, to form the treated downhole surface (e.g., treated fracture face surface), thereby preventing the formation and/or accumulation of a condensate bank and/or any other undesired accumulation of liquid in the wellbore and/or subterranean formation. The WSF comprising the omniphobic emulsion as disclosed herein may permeate into (e.g., sip in, enter, penetrate, etc.) the fracture (e.g., fracture face), thereby forming a treated downhole surface (e.g., treated fracture surface, treated fracture face surface, etc.).

In some embodiments, the fracture may exclude a particulate material. In such embodiments, the WSF comprising the omniphobic emulsion as disclosed herein may be a pad fluid used to initiate a fracture, wherein the fracture may not be further treated with a particulate material, or alternatively the fracture may be subsequently consolidated and/or enlarged by using a WSF comprising a particulate material (which may or may not comprise the omniphobic agent).

In some embodiments, the fracture may comprise a particulate material (e.g., proppant, gravel, etc.), wherein the treated downhole surface further comprises a treated particulate material surface (e.g., treated proppant surface, treated gravel surface, etc.).

In embodiments where the fracture comprises a particulate material, a particulate material surface (e.g., proppant surface, gravel surface, etc.) can be contacted with the omniphobic emulsion (1) prior to placing a particulate material (e.g., proppant, gravel, etc.) comprising the particulate material surface (e.g., proppant surface, gravel surface, etc.) in the wellbore and/or subterranean formation, (2) during placing a particulate material (e.g., proppant, gravel, etc.) comprising the particulate material surface (e.g., proppant surface, gravel surface, etc.) in the wellbore and/or subterranean formation, (3) subsequent to placing a particulate material (e.g., proppant, gravel, etc.) comprising the particulate material surface (e.g., proppant surface, gravel surface, etc.) in the wellbore and/or subterranean formation, or combinations of (1)-(3).

In other embodiments, the WSF comprising the omniphobic emulsion as disclosed herein may be introduced as a remedial treatment (e.g., injected, placed, circulated, etc.) in a region of interest in the wellbore and/or subterranean formation, such as a near-wellbore region; wherein the near-wellbore region comprises a fracture having a fracture face surface; wherein the omniphobic emulsion contacts a downhole surface in the near-wellbore region, such as a fracture face surface, to form the treated downhole surface (e.g., treated fracture face surface), thereby allowing for the removal of at least a portion of a condensate bank and/or any other undesired accumulation of liquid already present in the wellbore and/or subterranean formation. The WSF comprising the omniphobic emulsion as disclosed herein may permeate into (e.g., sip in, enter, penetrate, etc.) the fracture (e.g., fracture face), thereby forming a treated downhole surface (e.g., treated fracture surface, treated fracture face surface, etc.) and displacing a condensate bank and/or any other undesired accumulation of liquid already present in the near-wellbore region, thereby allowing for the removal of at least a portion of a condensate bank and/or any other undesired accumulation of liquid already present in the wellbore and/or subterranean formation. The fracture may exclude a particulate material; or alternatively, the fracture may comprise a particulate material.

In embodiments where the fracture comprises a particulate material pack, the particulate material pack may comprise a condensate bank and/or any other undesired accumulation of liquid. In such embodiments, the WSF comprising the omniphobic emulsion may permeate into (e.g., sip in, enter, penetrate, etc.) the particulate material pack (e.g., proppant pack and/or gravel pack), thereby forming a treated downhole surface (e.g., treated particulate material surface, treated proppant surface, treated gravel surface, etc.) and displacing a condensate bank and/or any other undesired accumulation of liquid already present in the particulate material pack, thereby allowing for the removal of at least a portion of a condensate bank and/or any other undesired accumulation of liquid already present in the particulate material pack.

In some embodiments, a method of servicing a wellbore in a subterranean formation may comprise (a) contacting an aqueous fluid, a surfactant and an omniphobic agent under a shear rate of from about $10 \text{ s}^{-1}$ to about $50,000 \text{ s}^{-1}$ to form the omniphobic emulsion of any of claims 1-8; (b) placing in the wellbore and/or subterranean formation a pad fluid and forming one or more fractures in the subterranean formation, wherein the one or more fractures are characterized by a fracture face surface, and wherein the one or more fractures are in fluid communication with the wellbore; (c) contacting the omniphobic emulsion with a downhole surface to form a treated downhole surface; wherein at least a portion of the treated downhole surface comprises the omniphobic agent; wherein the treated downhole surface is characterized by decreased wettability when compared to the wettability of the same downhole surface prior to contacting with the omniphobic emulsion; wherein the downhole surface comprises at least a portion of the fracture face surface; and wherein the treated downhole surface comprises a treated fracture face surface; (d) optionally placing in the one or more fractures a fracturing fluid comprising a proppant having a proppant surface, wherein the downhole surface further comprises at least a portion of the proppant surface, wherein the treated downhole surface further comprises a treated proppant surface, and wherein the fracturing fluid further comprises the omniphobic emulsion; (e) flowing back outside the wellbore at least a portion of the pad fluid and/or fracturing fluid to yield a recovered pad fluid and/or a recovered fracturing fluid, respectively; wherein the amount of recovered pad fluid and/or the amount of recovered fracturing fluid is greater than an amount of pad fluid and/or an amount of fracturing fluid, respectively, recovered from an otherwise similar wellbore and/or subterranean formation that do not comprise a treated downhole surface; and (f) recovering natural gas and/or oil from the wellbore and/or subterranean formation, wherein the amount of recovered natural gas and/or the amount of recovered oil is greater than an amount of natural gas and/or an amount of oil, respectively, recovered from an otherwise similar wellbore and/or subterranean formation that do not comprise a treated downhole surface. In such embodiments, the treated downhole surface may provide for preventing and/or reducing the formation of a condensate bank in the subterranean formation surrounding the wellbore. In embodiments where the wellbore and/or subterranean formation comprises a condensate bank, the condensate bank can decrease a fluid conductivity of the wellbore and/or subterranean formation, wherein the treated downhole surface provides for removing of at least a portion of the condensate bank from the subterranean formation surrounding the wellbore (owing to increased flowability of liquids over the treated downhole surface), thereby increasing the conductivity of fluid flowing into the wellbore from the subterranean formation. In embodiments where the fracture is a propped fracture, the proppant surface may be contacted with the omniphobic emulsion (1) prior to placing the proppant having the proppant surface in the one or more fractures, (2) during placing the proppant having the proppant surface in the one or more fractures, (3) subsequent to placing the proppant having the proppant surface in the one or more fractures, or combinations of (1)-(3).

In some embodiments, omniphobic emulsions and methods of making and using same as disclosed herein may display advantages when compared with conventional omniphobic agent compositions. Conventionally, nanoparticles can be employed as treatment carriers of omniphobic agents to provide anti-oil and anti-water property to the treated surfaces. However, the omniphobic emulsions as disclosed herein are more cost effective than nanoparticles carrying omniphobic agents, and can advantageously display more ease of downhole treatment applications when compared to nanoparticle-based treatments.

In some embodiments, the omniphobic properties of the treated downhole surfaces may advantageously enhance recovery of a fracturing fluid and/or gravel packing fluid (e.g., aqueous fracturing fluid and/or aqueous gravel packing fluid) from a fracture, as well as prevent liquid build-up within the fracture; owing to the water repellent nature of the treated downhole surfaces; wherein the expeditious removal of aqueous fracturing fluid and/or aqueous gravel packing fluid may advantageously allow for placing a well on production quickly. Further, the oil repellent nature of the treated downhole surfaces may advantageously prevent build-up of liquid hydrocarbons in the fracture, thus enhancing production of hydrocarbons from the fracture.

In some embodiments, the omniphobic emulsion as disclosed herein may advantageously provide for enhancing load recovery, and/or removal of aqueous fracturing fluid and/or aqueous gravel packing fluid to help place a well on production quickly.

In some embodiments, the omniphobic emulsion as disclosed herein may advantageously allow for ease of placement of the omniphobic agent in a propped fracture to treat and alter the wettability of proppant and fracture faces.

In some embodiments, the omniphobic emulsion as disclosed herein may advantageously allow for ease of placement of the omniphobic agent in a near-wellbore region of a reservoir formation (e.g., subterranean formation) surrounding the wellbore to treat and alter the wettability of pore surfaces of formation.

In some embodiments, the omniphobic emulsion as disclosed herein may advantageously allow for ease of placement of the omniphobic agent in a propped fracture and/or in a near-wellbore region of a reservoir formation (e.g., subterranean formation) surrounding the wellbore, to penetrate, displace, and remove a condensate bank formed in the flow spaces of the proppant pack (e.g., pore spaces of proppant pack) in the propped fracture and/or the pore spaces in the formation of the near-wellbore region surrounding the wellbore.

In some embodiments, the omniphobic emulsion as disclosed herein may advantageously allow for removing the condensate bank formed in a propped fracture and/or in the formation of the near-wellbore region surrounding the wellbore to establish or re-establish a flow path for a natural resource (e.g., gas and/or oil) production.

In some embodiments, the omniphobic emulsion as disclosed herein may advantageously provide for preventing the formation of a condensate bank, thereby enhancing and/or maintaining the production rate of a natural resource (e.g., gas and/or oil).

In some embodiments, an applied wellbore servicing treatment comprising the omniphobic emulsion as disclosed herein may advantageously greatly enhance removal of both aqueous-based and oil-based liquids, thereby enhancing production of natural gas by decreasing any obstruction in its flow paths. Additional advantages of the omniphobic emulsions and methods of making and using same may be apparent to one of skill in the art viewing this disclosure.

ADDITIONAL DISCLOSURE

Embodiment A: An omniphobic emulsion comprising an aqueous continuous phase (10) having dispersed therein a plurality of non-aqueous discontinuous phase droplets (20); wherein the non-aqueous discontinuous phase droplets (20) are characterized by a droplet size of less than about 100 micrometers (μm); wherein each of the plurality of non-aqueous discontinuous phase droplets (20) comprises a plurality of surfactant (21) molecules and an omniphobic agent (25), wherein each surfactant (21) molecule has a hydrophilic head portion (21a) and a hydrophobic tail portion (21b); wherein each of the plurality of non-aqueous discontinuous phase droplets (20) comprises the plurality surfactant (21) molecules having the hydrophilic head portions (21a) disposed into a droplet outer layer (22) with the hydrophobic tail portions (21b) extending inward from the droplet outer layer (22) toward the omniphobic agent (25); wherein the droplet outer layer (22) encloses the omniphobic agent (25); and wherein the omniphobic agent (25) is selected from the group consisting of solvated silicon dioxide, an organo-siloxane, a fluoropolymer, a fluorinated compound, a tetrafluoroethylene/(perfluoroalkyl) vinyl ether copolymer, a perfluoroalkyl phosphate, a perfluoroalkyl ethyl methacrylate, a fluorinated hydrocarbon, a polyfluoroalkylethyl methacrylate/alkylmethacrylate copolymer, perfluoroalcohol phosphate, a perfluoroalcohol phosphate/polysiloxane mixture, a perfluoroalcohol phosphate/acrylate silicone copolymer mixture, a tetrafluoroethylene/hexafluoropropylene copolymer, polytetrafluoroethylene, polyxylylene, a fluorinated polyhedral oligomeric silsequioxane, an alkoxysilane, a chlorosilane, a fluorosilane, a perfluoroalkylsilane, a fluorosilane having an urethane linkage, a fluorosilane having its silicone part partially modified with fluorine or fluoride, a fluorosiloxane, a fluoroalkylsilane, a fluorosilazane, and combinations thereof.

Embodiment B: The omniphobic emulsion of Embodiment A, wherein the surfactant (21) comprises an alkanolamide surfactant, an alcohol, an alkoxylated alcohol, an ethoxylated alcohol, a fatty acid ethoxylated surfactant, an alkyl glycoside surfactant, an amine-oxide surfactant, an olefin sulfonate, a betaine, a branched alcohol, a polyol, a polyamine, an anionic surfactant, a cationic surfactant, an amphoteric surfactant, or combinations thereof.

Embodiment C: The omniphobic emulsion of any one of Embodiments A and B, wherein the omniphobic emulsion is a foamed omniphobic emulsion comprising the aqueous continuous phase (10) having dispersed therein the plurality of non-aqueous discontinuous phase droplets (20) and a plurality of discontinuous gas phase pores (30); wherein the foamed omniphobic emulsion is characterized by a porosity equal to or greater than about 5 vol. %, based on the total volume of the foamed omniphobic emulsion; wherein the discontinuous gas phase pores (30) are characterized by a pore size that is greater than the droplet size; wherein at least a portion of the non-aqueous discontinuous phase droplets (20) are disposed at a gas-liquid interface (40) between the aqueous continuous phase (10) and the plurality of discontinuous gas phase pores (30), thereby forming a plurality of non-aqueous discontinuous phase shells (50); and wherein each of the plurality of non-aqueous discontinuous phase shells (50) encloses a discontinuous gas phase pore (30).

Embodiment D: The omniphobic emulsion of Embodiment C, wherein the plurality of discontinuous gas phase pores (30) comprise nitrogen, carbon dioxide, methane, propane, natural gas, or combinations thereof.

Embodiment E: The omniphobic emulsion of any one of Embodiments A through D, wherein the non-aqueous discontinuous phase droplets (20) are characterized by a droplet size of from equal to or greater than about 1 μm to less than about 100 μm.

Embodiment F: The omniphobic emulsion of any one of Embodiments A through E, wherein the non-aqueous discontinuous phase droplets (20) are characterized by a droplet size of from equal to or greater than about 10 nanometers (nm) to less than about 1 μm.

Embodiment G: The omniphobic emulsion of any one of Embodiments A through E, wherein the omniphobic agent (25) is present in the omniphobic emulsion in an amount of from about 0.05 wt. % to about 10 wt. %, based on the total weight of the omniphobic emulsion; and wherein the surfactant (21) is present in the omniphobic emulsion in an amount of from about 0.05 wt. % to about 10 wt. %, based on the total weight of the omniphobic emulsion.

Embodiment H: The omniphobic emulsion of any one of Embodiments A through G, wherein the omniphobic agent (25) is present in the omniphobic emulsion in an amount of from about 0.01 wt. % to about 3 wt. %, based on the total weight of the omniphobic emulsion; and wherein the surfactant (21) is present in the omniphobic emulsion in an amount of from about 0.01 wt. % to about 3 wt. %, based on the total weight of the omniphobic emulsion.

Embodiment I: A wellbore servicing fluid (WSF) comprising the omniphobic emulsion of any one of Embodiments A through H.

Embodiment J: The WSF of Embodiment I, wherein the WSF is selected from the group consisting of a fracturing fluid, a pad fluid, a gravel packing fluid, a completion fluid, a stimulation fluid, a spacer fluid, a workover fluid, a drill-in fluid, and a drilling fluid.

Embodiment K: A method of making an omniphobic emulsion comprising contacting an aqueous fluid, a surfactant and an omniphobic agent under a shear rate of from about 10 s$^{-1}$ to about 50,000 s$^{-1}$ to form the omniphobic emulsion of any one of Embodiments A through H.

Embodiment L: The method of Embodiment K further comprising contacting a foam precursor with the aqueous fluid, the surfactant, the omniphobic agent, or combinations thereof; wherein the foam precursor is selected from the group consisting of nitrogen, carbon dioxide, methane, propane, natural gas, liquefied natural gas, and combinations thereof; and wherein the omniphobic emulsion comprises an omniphobic emulsion foam.

Embodiment M: The method of any one of Embodiments K and L, wherein the aqueous fluid, the surfactant and the omniphobic agent are contacted (i) off-site, followed by transporting at least a portion of the omniphobic emulsion to a well site; (ii) on location at a well site; or (iii) in situ downhole in a wellbore.

Embodiment N: The method of any one of Embodiments K through M, wherein the shear rate of from about 10 s$^{-1}$ to about 50,000 s$^{-1}$ is provided by a blender, a mixer, a downhole mixer, an in-line mixer, jetting, or combinations thereof.

Embodiment O: A method of servicing a wellbore in a subterranean formation comprising contacting the omniphobic emulsion of any one of Embodiments A through H with a downhole surface to form a treated downhole surface; wherein at least a portion of the treated downhole surface comprises the omniphobic agent; wherein the treated downhole surface is characterized by decreased wettability when compared to the wettability of the same downhole surface prior to contacting with the omniphobic emulsion; and wherein at least a portion of the wellbore and/or subterranean formation is characterized by increased fluid conductivity when compared to the fluid conductivity of the same wellbore and/or subterranean formation prior to contacting the downhole surface with the omniphobic emulsion.

Embodiment P: The method of Embodiment O, wherein the downhole surface comprises a wellbore surface, a wellbore equipment surface, a near-wellbore region surface, a subterranean formation surface, a subterranean formation pore surface, a fracture surface, a natural fracture surface, an induced fracture face surface, a proppant surface, or combinations thereof.

Embodiment Q: The method of any one of Embodiments O and P, wherein the subterranean formation excludes a fracture.

Embodiment R: The method of any one of Embodiments O and P, wherein the subterranean formation comprises one or more fractures, and wherein the downhole surface comprises a fracture face surface.

Embodiment S: The method of Embodiment R, wherein the one or more fractures comprises a proppant, and wherein the downhole surface further comprises a proppant surface.

Embodiment T: The method of Embodiment S, wherein the proppant surface is contacted with the omniphobic emulsion (1) prior to placing a proppant comprising the proppant surface in the wellbore and/or subterranean formation, (2) during placing a proppant comprising the proppant surface in the wellbore and/or subterranean formation, (3) subsequent to placing a proppant comprising the proppant surface in the wellbore and/or subterranean formation, or combinations of (1)-(3).

Embodiment U: The method of any one of Embodiments O through U, wherein the treated downhole surface provides for preventing and/or reducing the formation of a condensate bank in the wellbore and/or subterranean formation.

Embodiment V: The method of any one of Embodiments O through T, wherein the wellbore and/or subterranean formation comprise a condensate bank, wherein the condensate bank decreases a fluid conductivity of the wellbore and/or subterranean formation, and wherein the treated downhole surface provides for removing of at least a portion of the condensate bank from the wellbore and/or subterranean formation, thereby increasing the conductivity of fluid flowing into the wellbore from the subterranean formation.

Embodiment W: A method of servicing a wellbore in a subterranean formation comprising (a) contacting an aqueous fluid, a surfactant and an omniphobic agent under a shear rate of from about 10 s$^{-1}$ to about 50,000 s$^{-1}$ to form the omniphobic emulsion of any of claims 1-8; (b) placing in the wellbore and/or subterranean formation a pad fluid and forming one or more fractures in the subterranean formation, wherein the one or more fractures are characterized by a fracture face surface, and wherein the one or more fractures are in fluid communication with the wellbore; and (c) contacting the omniphobic emulsion with a downhole surface to form a treated downhole surface; wherein at least a portion of the treated downhole surface comprises the omniphobic agent; wherein the treated downhole surface is characterized by decreased wettability when compared to the wettability of the same downhole surface prior to contacting with the omniphobic emulsion; wherein the downhole surface comprises at least a portion of the fracture face surface; and wherein the treated downhole surface comprises a treated fracture face surface.

Embodiment X: The method of Embodiment W further comprising placing in the one or more fractures a fracturing fluid comprising a proppant having a proppant surface, wherein the downhole surface further comprises at least a portion of the proppant surface, and wherein the treated downhole surface further comprises a treated proppant surface.

Embodiment Y: The method of Embodiment X, wherein the pad fluid and/or the fracturing fluid comprise the omniphobic emulsion.

Embodiment Z: The method of any one of Embodiments W and X, wherein the proppant surface is contacted with the omniphobic emulsion (1) prior to placing the proppant having the proppant surface in the one or more fractures, (2) during placing the proppant having the proppant surface in the one or more fractures, (3) subsequent to placing the proppant having the proppant surface in the one or more fractures, or combinations of (1)-(3).

Embodiment AA: The method of any one of Embodiments W through Z further comprising flowing back outside the wellbore at least a portion of the pad fluid and/or fracturing fluid to yield a recovered pad fluid and/or a recovered fracturing fluid, respectively; wherein the amount of recovered pad fluid and/or the amount of recovered fracturing fluid is greater than an amount of pad fluid and/or an amount of fracturing fluid, respectively, recovered from an otherwise similar wellbore and/or subterranean formation that do not comprise a treated downhole surface.

Embodiment BB: The method of any one of Embodiments W through AA, wherein the treated downhole surface provides for preventing and/or reducing the formation of a condensate bank in the subterranean formation surrounding the wellbore.

Embodiment CC: The method of any one of Embodiments W through AA, wherein the wellbore and/or subterranean formation comprise a condensate bank, wherein the condensate bank decreases a fluid conductivity of the wellbore and/or subterranean formation, and wherein the treated downhole surface provides for removing of at least a portion of the condensate bank from the subterranean formation surrounding the wellbore, thereby increasing the conductivity of fluid flowing into the wellbore from the subterranean formation.

Embodiment DD: The method of any one of Embodiments W through CC further comprising recovering natural gas and/or oil from the wellbore and/or subterranean formation, wherein the amount of recovered natural gas and/or the amount of recovered oil is greater than an amount of natural gas and/or an amount of oil, respectively, recovered from an otherwise similar wellbore and/or subterranean formation that do not comprise a treated downhole surface.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. An omniphobic emulsion comprising: an aqueous continuous phase having dispersed therein a plurality of non-aqueous discontinuous phase droplets;
wherein the non-aqueous discontinuous phase droplets are characterized by a droplet size of less than about 100 micrometers (μm);
wherein each of the plurality of non-aqueous discontinuous phase droplets comprises a plurality of surfactant molecules and an omniphobic agent, wherein each surfactant molecule has a hydrophilic head portion and a hydrophobic tail portion;
wherein each of the plurality of non-aqueous discontinuous phase droplets comprises the plurality surfactant molecules having the hydrophilic head portions disposed into a droplet outer layer with the hydrophobic tail portions extending inward from the droplet outer layer toward the omniphobic agent;
wherein the droplet outer layer encloses the omniphobic agent; and
wherein the omniphobic agent is selected from the group consisting of solvated silicon dioxide, an organo-siloxane, a fluoropolymer, a fluorinated compound, a tetrafluoroethylene/(perfluoroalkyl) vinyl ether copolymer, a perfluoroalkyl phosphate, a perfluoroalkyl ethyl methacrylate, a fluorinated hydrocarbon, a polyfluoroalkylethyl methacrylate/alkylmethacrylate copolymer, perfluoroalcohol phosphate, a perfluoroalcohol phosphate/polysiloxane mixture, a perfluoroalcohol phosphate/acrylate silicone copolymer mixture, a tetrafluoroethylene/hexafluoropropylene copolymer, polytetrafluoroethylene, polyxylylene, a fluorinated polyhedral oligomeric silsequioxane, an alkoxysilane, a chlorosilane, a fluorosilane, a perfluoroalkylsilane, a fluorosilane having an urethane linkage, a fluorosilane having its silicone part partially modified with fluorine or fluoride, a fluorosiloxane, a fluoroalkylsilane, a fluorosilazane, and combinations thereof.

2. The omniphobic emulsion of claim 1, wherein the surfactant comprises an alkanolamide surfactant, an alcohol, an alkoxylated alcohol, an ethoxylated alcohol, a fatty acid ethoxylated surfactant, an alkyl glycoside surfactant, an amine-oxide surfactant, an olefin sulfonate, a betaine, a branched alcohol, a polyol, a polyamine, an anionic surfactant, a cationic surfactant, an amphoteric surfactant, or combinations thereof.

3. The omniphobic emulsion of claim 1, wherein the omniphobic emulsion is a foamed omniphobic emulsion comprising the aqueous continuous phase having dispersed therein the plurality of non-aqueous discontinuous phase droplets and a plurality of discontinuous gas phase pores; wherein the foamed omniphobic emulsion is characterized by a porosity equal to or greater than about 5 vol. %, based on the total volume of the foamed omniphobic emulsion; wherein the discontinuous gas phase pores are characterized by a pore size that is greater than the droplet size; wherein at least a portion of the non-aqueous discontinuous phase droplets are disposed at a gas-liquid interface between the aqueous continuous phase and the plurality of discontinuous gas phase pores, thereby forming a plurality of non-aqueous discontinuous phase shells; and wherein each of the plurality of non-aqueous discontinuous phase shells encloses a discontinuous gas phase pore.

4. The omniphobic emulsion of claim 3, wherein the plurality of discontinuous gas phase pores comprise nitrogen, carbon dioxide, methane, propane, natural gas, or combinations thereof.

5. The omniphobic emulsion of claim 1, wherein the non-aqueous discontinuous phase droplets are characterized by a droplet size of from equal to or greater than about 1 μm to less than about 100 μm.

6. The omniphobic emulsion of claim 1, wherein the non-aqueous discontinuous phase droplets are characterized by a droplet size of from equal to or greater than about 10 nanometers (nm) to less than about 1 μm.

7. The omniphobic emulsion of claim 1, wherein the omniphobic agent is present in the omniphobic emulsion in an amount of from about 0.05 wt. % to about 10 wt. %, based on the total weight of the omniphobic emulsion; and wherein the surfactant is present in the omniphobic emulsion in an amount of from about 0.05 wt. % to about 10 wt. %, based on the total weight of the omniphobic emulsion.

8. The omniphobic emulsion of claim 1, wherein the omniphobic agent is present in the omniphobic emulsion in an amount of from about 0.01 wt. % to about 3 wt. %, based on the total weight of the omniphobic emulsion; and wherein the surfactant is present in the omniphobic emulsion in an amount of from about 0.01 wt. % to about 3 wt. %, based on the total weight of the omniphobic emulsion.

9. A wellbore servicing fluid (WSF) comprising the omniphobic emulsion of claim 1.

10. The wellbore servicing fluid of claim 9, wherein the WSF is selected from the group consisting of a fracturing fluid, a pad fluid, a gravel packing fluid, a completion fluid, a stimulation fluid, a spacer fluid, a workover fluid, a drill-in fluid, and a drilling fluid.

11. A method of making the omniphobic emulsion of claim 1 comprising contacting an aqueous fluid, a surfactant and an omniphobic agent under a shear rate of from about 10 $s^{-1}$ to about 50,000 $s^{-1}$ to form the omniphobic emulsion of claim 1.

12. The method of claim 11 further comprising contacting a foam precursor with the aqueous fluid, the surfactant, the omniphobic agent, or combinations thereof; wherein the foam precursor is selected from the group consisting of nitrogen, carbon dioxide, methane, propane, natural gas, liquefied natural gas, and combinations thereof; and wherein the omniphobic emulsion comprises an omniphobic emulsion foam.

13. A method of servicing a wellbore in a subterranean formation comprising contacting the omniphobic emulsion of claim 1 with a downhole surface to form a treated downhole surface.

14. The method of claim 13, wherein the downhole surface comprises a wellbore surface, a wellbore equipment surface, a near-wellbore region surface, a subterranean formation surface, a subterranean formation pore surface, a fracture surface, a natural fracture surface, an induced fracture face surface, a proppant surface, or combinations thereof.

15. The method of claim 13, wherein the subterranean formation excludes a fracture.

16. The method of claim 13, wherein the subterranean formation comprises one or more fractures, and wherein the downhole surface comprises a fracture face surface.

17. The method of claim 16, wherein the one or more fractures comprises a proppant, and wherein the downhole surface further comprises a proppant surface.

18. The method of claim 17, wherein the proppant surface is contacted with the omniphobic emulsion (1) prior to placing a proppant comprising the proppant surface in the wellbore and/or subterranean formation, (2) during placing a proppant comprising the proppant surface in the wellbore and/or subterranean formation, (3) subsequent to placing a proppant comprising the proppant surface in the wellbore and/or subterranean formation, or combinations of (1)-(3).

19. The method of claim 13, wherein the treated downhole surface provides for preventing and/or reducing the formation of a condensate bank in the wellbore and/or subterranean formation.

20. The method of claim 13, wherein the wellbore and/or subterranean formation comprise a condensate bank, wherein the condensate bank decreases a fluid conductivity of the wellbore and/or subterranean formation, and wherein the treated downhole surface provides for removing of at least a portion of the condensate bank from the wellbore and/or subterranean formation, thereby increasing the conductivity of fluid flowing into the wellbore from the subterranean formation.

* * * * *

UNITED STATES PATENT AND TRADEMARK OFFICE
CERTIFICATE OF CORRECTION

PATENT NO. : 10,975,292 B2
APPLICATION NO. : 16/439096
DATED : April 13, 2021
INVENTOR(S) : Philip D. Nguyen and Tatyana V. Khamatnurova It is certified that error appears in the above-identified patent and that said Letters Patent is hereby corrected as shown below:

On the Title Page

Item (73) Assignee: replace "Halliburton Energy Sendees, Inc." with --Halliburton Energy Services, Inc.--.

In the Specification

Column 7, Line 61, replace "VI" with --Structure VI--.

Column 7, Line 63, replace "VII" with --Structure VII--.

Column 9, Lines 16-17, replace "from about 50 nm to about 75 nm" with --from about 50 nm to about 750 nm--.

Column 13, Line 59, replace "from about 0.0 5 wt.%" with --from about 0.05 wt.%--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*